(12) United States Patent
Ferry et al.

(10) Patent No.: US 11,641,385 B1
(45) Date of Patent: May 2, 2023

(54) VERIFYING PERFORMANCE AND OPERATION OF LIVE SERVICES

(71) Applicant: DexCare, Inc., Seattle, WA (US)

(72) Inventors: Chandler Boone Ferry, Auburn, WA (US); Robert Albert Wlodarczyk, Issaquah, WA (US); William Tomer, Bainbridge Island, WA (US); Jeffrey Alan Herold, Kirkland, WA (US)

(73) Assignee: DexCare, Inc., Seattle, WA (US)

( * ) Notice: Subject to any disclaimer, the term of this patent is extended or adjusted under 35 U.S.C. 154(b) by 0 days.

(21) Appl. No.: 17/837,218

(22) Filed: Jun. 10, 2022

(51) Int. Cl.
| | |
|---|---|
| H04L 65/611 | (2022.01) |
| H04L 41/0869 | (2022.01) |
| H04L 41/084 | (2022.01) |
| H04L 67/133 | (2022.01) |
| H04L 67/51 | (2022.01) |
| H04L 41/0893 | (2022.01) |
| H04L 1/00 | (2006.01) |
| G06F 11/36 | (2006.01) |

(52) U.S. Cl.
CPC ........ H04L 65/611 (2022.05); G06F 11/3688 (2013.01); H04L 1/0025 (2013.01); H04L 41/0843 (2013.01); H04L 41/0869 (2013.01); H04L 41/0893 (2013.01); H04L 67/133 (2022.05); H04L 67/51 (2022.05)

(58) Field of Classification Search
CPC ....... H04L 65/611; H04L 67/01; H04L 43/55; H04L 65/70; H04L 1/0025; H04L 1/0014; H04N 17/004; G06F 11/3688
See application file for complete search history.

(56) References Cited

U.S. PATENT DOCUMENTS

| | | | |
|---|---|---|---|
| 8,145,726 B1 * | 3/2012 | Roche | ................ G06F 11/3688 |
| | | | 709/219 |
| 9,497,412 B1 | 11/2016 | Rosenberg | |

(Continued)

FOREIGN PATENT DOCUMENTS

WO    2016019227 A1    2/2016

OTHER PUBLICATIONS

Office Communication for U.S. Appl. No. 17/551,084 dated Mar. 14, 2022, pp. 1-52.
Tan, Joseph et al., "From Telemedicine to E-Health: Uncovering New Frontiers of Biomedical Research, Clinical Applications & Public Health Services Delivery," The Journal of Computer Information Systems, 2002, vol. 42, No. 5, pp. 7-18.

(Continued)

*Primary Examiner* — Kyung H Shin
(74) *Attorney, Agent, or Firm* — John W. Branch; Branch Partners PLLC

(57) ABSTRACT

Embodiments are directed to verifying performance and operation of live services. Applications operative in a computing environment and directed to a plurality of organizations may be provided such that the applications include data associated with different organizations. Templates that declare template objects may be provided such that the template objects may be directed to verifying features of the applications. Data associated with the organization may be provided based on the template objects. Verification objects may be generated based on the template objects and the provided data. The verification objects may be employed to verify the features of the applications based on verification conditions and the provided data. Reports that include results based on verification conditions and the provided data may be provided.

20 Claims, 11 Drawing Sheets

(56) References Cited

U.S. PATENT DOCUMENTS

| | | | |
|---|---|---|---|
| 2004/0185785 A1* | 9/2004 | Mir | H04L 1/0025 455/67.14 |
| 2006/0271400 A1 | 11/2006 | Clements et al. | |
| 2014/0180715 A1 | 6/2014 | Phillips et al. | |
| 2016/0308737 A1* | 10/2016 | Liu | H04L 65/611 |
| 2017/0272485 A1 | 9/2017 | Gordon et al. | |
| 2019/0122760 A1 | 4/2019 | Wang | |
| 2019/0333613 A1 | 10/2019 | Zaidi et al. | |
| 2020/0222813 A1 | 7/2020 | Baszucki | |
| 2020/0357494 A1 | 11/2020 | Kadri et al. | |
| 2021/0314526 A1 | 10/2021 | Astarabadi et al. | |
| 2021/0399911 A1 | 12/2021 | Jorasch et al. | |
| 2021/0400142 A1 | 12/2021 | Jorasch et al. | |
| 2022/0165401 A1 | 5/2022 | Levitt | |
| 2022/0215970 A1 | 7/2022 | Trpkovski et al. | |

OTHER PUBLICATIONS

Office Communication for U.S. Appl. No. 17/692,738 dated Jun. 13, 2022, pp. 1-9.

Office Communication for U.S. Appl. No. 17/551,084 dated Jul. 1, 2022, pp. 1-59.

Office Communication for U.S. Appl. No. 17/551,084 dated Sep. 16, 2022, pp. 1-5.

Office Communication for U.S. Appl. No. 17/692,738 dated Oct. 4, 2022, pp. 1-10.

Office Communication for U.S. Appl. No. 17/551,084 dated Nov. 15, 2022, pp. 1-61.

Office Communication for U.S. Appl. No. 17/692,738 dated Jan. 5, 2023, pp. 1-8.

Office Communication for U.S. Appl. No. 17/551,084 dated Mar. 6, 2023, pp. 1-26.

* cited by examiner

VERIFYING PERFORMANCE AND OPERATION OF LIVE SERVICES

TECHNICAL FIELD

The present invention relates generally to acceptance testing for distributed services or applications, and more particularly, but not exclusively, to verifying performance and operation of live services.

BACKGROUND

Contemporary services or applications may have many complex or critical features that require verification or testing to ensure that they function as required. Accordingly, as features or feature complexity increase, verifying performance and operations of services may require increased effort. In some cases, a linear growth in features may result in exponential increases in effort or resources. Further, in some cases, services or applications may be required to support a wide-variety of deployment/operation configurations for different customers with different or unique configurations. Also, often verifying performance and operation of live services may depend on data or configurations that may be unique to particular customers. Likewise, some customers may require different features or additional features than other customers. In some cases, tests for verifying performance and operation of live services for some customers may depend on live data or configuration that may be difficult or impossible to reproduce or otherwise mock-up in test environments. Thus, it is with respect to these considerations and others that the present invention has been made.

BRIEF DESCRIPTION OF THE DRAWINGS

Non-limiting and non-exhaustive embodiments of the present innovations are described with reference to the following drawings. In the drawings, like reference numerals refer to like parts throughout the various figures unless otherwise specified. For a better understanding of the described innovations, reference will be made to the following Detailed Description of Various Embodiments, which is to be read in association with the accompanying drawings, wherein.

DETAILED DESCRIPTION OF VARIOUS EMBODIMENTS

Figure 1:
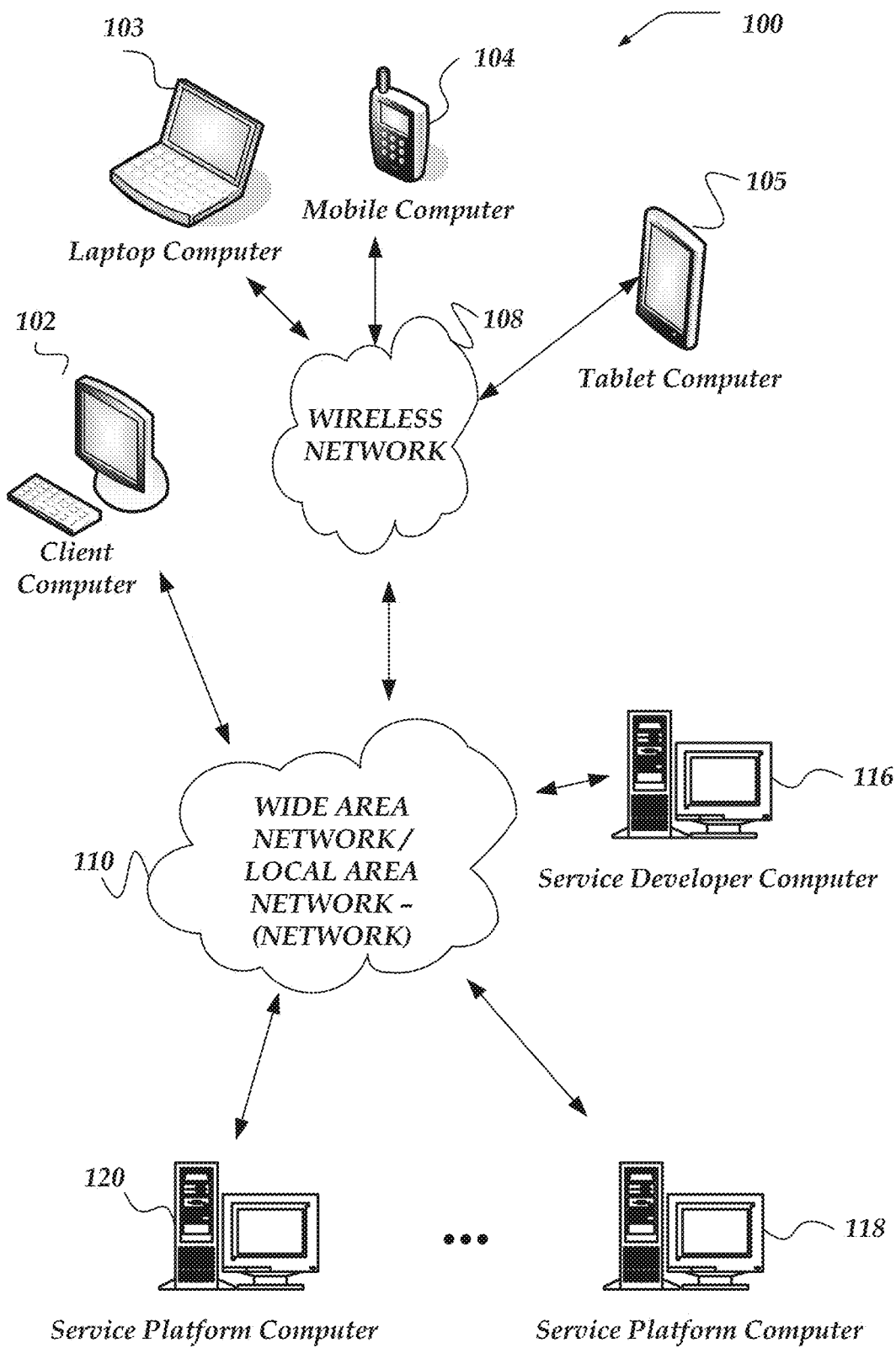
FIG. 1 illustrates a system environment in which various embodiments may be implemented.

Various embodiments now will be described more fully hereinafter with reference to the accompanying drawings, which form a part hereof, and which show, by way of illustration, specific exemplary embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media or devices. Accordingly, the various embodiments may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments may be readily combined, without departing from the scope or spirit of the invention.

In addition, as used herein, the term "or" is an inclusive "or" operator and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

For example embodiments, the following terms are also used herein according to the corresponding meaning, unless the context clearly dictates otherwise.

As used herein the term, "engine" refers to logic embodied in hardware or software instructions, which can be written in a programming language, such as C, C++, Objective-C, COBOL, Java™, PHP, Perl, Python, R, Julia, JavaScript, Ruby, VBScript, Microsoft.NET™ languages such as C#, or the like. An engine may be compiled into executable programs or written in interpreted programming languages. Software engines may be callable from other engines or from themselves. Engines described herein refer to one or more logical modules that can be merged with other engines or applications, or can be divided into sub-engines. The engines can be stored in non-transitory computer-readable medium or computer storage device and be stored on and executed by one or more general purpose computers, thus creating a special purpose computer configured to provide the engine.

As used herein, the term "service" refers to a computer-based application, platform, service, micro-service, or the like. Services may have one or more APIs, user interfaces, machine interfaces, or the like, that provide one or more features desirable to one or more customers. In some cases, a given service may comprise more than one other services working together to provide various features or functionality to a customer.

As used herein, the term "customer" refers to a person or organization that is enabled to use a service. Customers may be part of the same organization that provides a service. Also, in some cases, customers may be individuals or organizations that may be licensed or may be otherwise authorized to use one or more features of the service from the service developer/provider.

As used herein, the term "service environment" refers to a computers/network systems that a service may operate within. For example, the service environment of a local service running on a single server is the network computer and its associated processes. In other cases, service environments may span multiple services or networks. Also, service environment may include other support services or applications such as, databases, object stores, web-servers, one or more cloud compute instances in cloud environments, or the like. In general, a service environment may encapsulate compute resources, storage resources, security contexts, users, assets, or the like, of a service for one or more customers. In some cases, different service environments may have one or more distinct differences, such as, different customers, different security credentials, differences in available/licensed features, different users, different locations, different localization considerations, or the like.

As used herein, the term "developer service environment" refers to a service environment that may be associated with the development or provider of a service. Developer service environment may be considered the computing environment that service developers employ while developing services.

As used herein, the term "customer service environment" refers to a service environment for one or more customers. Services may be deployed or otherwise made available to customer service environments to enable the customer to use the services.

As used herein, the term "verification template" refers to one or more data structures that declare objects or actions to verify one or more features of a service. Verification templates may be compiled into verification agents targeted to particular service environments. In some cases, verification templates may declare actions, such as, queries, random selections, or the like, that may be executed in service environments as part of compiling verification agents.

As used herein, the term "verification agent" refers to one or more data structures represent one or more objects or actions that may be employed to verify features in a service environment. Verification agents may include data collected or sampled from the service environment undergoing verification.

As used herein, the term "template object" refers to one or more objects that are declared in a verification template.

As used herein, the term "verification objects" refer to template objects declared in a verification template that have been compiled. Accordingly, template objects in a verification template are converted into verification objects in a verification agent. Verification objects may include one or more attribute/fields that are populated based on data obtained from a particular service environment. Thus, the same template object used for different service environments may result in verification objects that represent that some type of entity but with different attribute values.

As used herein, the term "verification action" refers to instructions of executing one or more actions on behalf of a verification agent executing in or directed to a service environment. Verification actions may be based on instructions declared in verification templates. Thus, verification actions may be included in verification agents.

As used herein, the term, "configuration information" refers to information that may include rule based policies, pattern matching, scripts (e.g., computer readable instructions), or the like, that may be provided from various sources, including, configuration files, databases, user input, built-in defaults, or the like, or combination thereof. In some cases, configuration information may include or reference information stored in other systems or services, such as, configuration management databases, Lightweight Directory Access Protocol (LDAP) servers, name services, public key infrastructure services, or the like.

The following briefly describes embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed to verifying performance and operation of live services. In one or more of the various embodiments, one or more applications that are operative in a computing environment and directed to a plurality of organizations may be provided such that a portion of the one or more applications include data associated with an organization from the plurality of organizations and a remainder of other applications include data associated with one or more other organizations from the plurality of organizations.

In one or more of the various embodiments, one or more templates that declare one or more template objects may be provided such that the one or more template objects may be directed to verifying one or more features of the one or more applications.

In one or more of the various embodiments, data associated with the organization may be provided based on the one or more template objects such that the data may be obtained from the portion of the one or more the applications or a data store associated with the portion of the one or more applications.

In one or more of the various embodiments, one or more verification objects may be generated based on the one or more template objects and the provided data associated with the organization.

In one or more of the various embodiments, the one or more verification objects may be employed to verify the one or more features of the one or more applications based on one or more conditions and the provided data associated with the organization.

In one or more of the various embodiments, one or more reports that include one or more results based on one or more conditions and the provided data associated with the organization and the one or more verified features of the one or more applications may be provided.

In one or more of the various embodiments, providing the data associated with the organization may include generating one or more random values based on a seed value associated with the organization such that reuse of a same seed value for the same organization generates the same one or more random values. And, in one or more of the various embodiments, the provided data associated with the organization may be determined based on the one or more random values and one or more source application programming interfaces.

In one or more of the various embodiments, employing the one or more verification objects may include: executing one or more verification actions based on the verification objects and the provided data associated with the organization; in response to one or more affirmative results for the one or more verification actions, determining that the one or more features of the one or more applications associated with the one or more verification actions are verified; in response to one or more negative results for the one or more verification actions, determining that the one or more features of the one or more applications associated with the one or more verification actions are unverified; or the like.

In one or more of the various embodiments, generating the one or more verification objects may include: determining one or more source application programming interfaces (APIs) based on a verification template; providing one or more declared parameter values based on one or more parameter declarations in the verification template; providing one or more other parameter values for a randomized selection of values from the provided data associated with the organization such that the randomized selection of values may be based on a seed value associated with the organization; executing the one or more source APIs with the one or more declared parameter values and the one or more other parameter values to provide one or more data values associated with the organization such that the one or more data values associated with the organization may be included in the one or more verification objects; in response to one or more subsequent executions of the one or more source APIs for the same organization, employing the seed value to provide the one or more other parameter values; or the like.

In one or more of the various embodiments, in response to the one or more applications separately supporting two or more separate organizations further actions may be performed, including; generating the one or more verification objects for each separate organization; generating two or more verification agents based on the one or more verification objects such that each verification agent may be based on the one or more verification objects that correspond to each separate organization; executing each verification agent in a computing environment associated with the two or more separate organizations to verify the one or more features of the one or more applications for the two or more separate organizations; or the like.

Illustrated Operating Environment

FIG. 1 shows components of one embodiment of an environment in which embodiments of the invention may be practiced. Not all of the components may be required to practice the invention, and variations in the arrangement and type of the components may be made without departing from the spirit or scope of the invention. As shown, system 100 of FIG. 1 includes local area networks (LANs)/wide area networks (WANs)—(network) 110, wireless network 108, client computers 102-105, service platform computer 116, service platform computer 118, or the like.

At least one embodiment of client computers 102-105 is described in more detail below in conjunction with FIG. 2. In one embodiment, at least some of client computers 102-105 may operate over one or more wired or wireless networks, such as networks 108, or 110. Generally, client computers 102-105 may include virtually any computer capable of communicating over a network to send and receive information, perform various online activities, offline actions, or the like. In one embodiment, one or more of client computers 102-105 may be configured to operate within a business or other entity to perform a variety of services for the business or other entity. For example, client computers 102-105 may be configured to operate as a web server, firewall, client application, media player, mobile telephone, game console, desktop computer, or the like. However, client computers 102-105 are not constrained to these services and may also be employed, for example, as for end-user computing in other embodiments. It should be recognized that more or less client computers (as shown in FIG. 1) may be included within a system such as described herein, and embodiments are therefore not constrained by the number or type of client computers employed.

Computers that may operate as client computer 102 may include computers that typically connect using a wired or wireless communications medium such as personal computers, multiprocessor systems, microprocessor-based or programmable electronic devices, network PCs, or the like. In some embodiments, client computers 102-105 may include virtually any portable computer capable of connecting to another computer and receiving information such as, laptop computer 103, mobile computer 104, tablet computers 105, or the like. However, portable computers are not so limited and may also include other portable computers such as cellular telephones, display pagers, radio frequency (RF) devices, infrared (IR) devices, Personal Digital Assistants (PDAs), handheld computers, wearable computers, integrated devices combining one or more of the preceding computers, or the like. As such, client computers 102-105 typically range widely in terms of capabilities and features. Moreover, client computers 102-105 may access various computing applications, including a browser, or other web-based application.

A web-enabled client computer may include a browser application that is configured to send requests and receive responses over the web. The browser application may be configured to receive and display graphics, text, multimedia, and the like, employing virtually any web-based language. In one embodiment, the browser application is enabled to employ JavaScript, HyperText Markup Language (HTML), eXtensible Markup Language (XML), JavaScript Object Notation (JSON), Cascading Style Sheets (CS S), or the like, or combination thereof, to display and send a message. In one embodiment, a user of the client computer may employ the browser application to perform various activities over a network (online). However, another application may also be used to perform various online activities.

Client computers 102-105 also may include at least one other client application that is configured to receive or send content between another computer. The client application may include a capability to send or receive content, or the like. The client application may further provide information that identifies itself, including a type, capability, name, and the like. In one embodiment, client computers 102-105 may uniquely identify themselves through any of a variety of mechanisms, including an Internet Protocol (IP) address, a phone number, Mobile Identification Number (MIN), an electronic serial number (ESN), a client certificate, or other device identifier. Such information may be provided in one or more network packets, or the like, sent between other client computers, service developer computer 116, service platform computer 118, service platform computer 120, or other computers.

Client computers 102-105 may further be configured to include a client application that enables an end-user to log into an end-user account that may be managed by another computer, such as service developer computer 116, service platform computer 118, service platform computer 120, or the like. Such an end-user account, in one non-limiting example, may be configured to enable the end-user to manage one or more online activities, including in one non-limiting example, project management, software development, system administration, configuration management, search activities, social networking activities, browse various websites, communicate with other users, or the like. Also, client computers may be arranged to enable users to display reports, interactive user-interfaces, results provided by service developer computer 116, service platform computer 118, service platform computer 120, or the like. Wireless network 108 is configured to couple client computers 103-105 and its components with network 110. Wireless network 108 may include any of a variety of wireless sub-networks that may further overlay stand-alone ad-hoc networks, and the like, to provide an infrastructure-oriented connection for client computers 103-105. Such sub-networks may include mesh networks, Wireless LAN (WLAN) networks, cellular networks, and the like. In one embodiment, the system may include more than one wireless network.

Wireless network 108 may further include an autonomous system of terminals, gateways, routers, and the like connected by wireless radio links, and the like. These connectors may be configured to move freely and randomly and organize themselves arbitrarily, such that the topology of wireless network 108 may change rapidly.

Wireless network 108 may further employ a plurality of access technologies including 2nd (2G), 3rd (3G), 4th (4G) 5th (5G) generation radio access for cellular systems, WLAN, Wireless Router (WR) mesh, and the like. Access technologies such as 2G, 3G, 4G, 5G, and future access networks may enable wide area coverage for mobile computers, such as client computers 103-105 with various degrees of mobility. In one non-limiting example, wireless network 108 may enable a radio connection through a radio network access such as Global System for Mobile communication (GSM), General Packet Radio Services (GPRS), Enhanced Data GSM Environment (EDGE), code division multiple access (CDMA), time division multiple access (TDMA), Wideband Code Division Multiple Access (WCDMA), High Speed Downlink Packet Access (HSDPA), Long Term Evolution (LTE), and the like. In essence, wireless network 108 may include virtually any wireless communication mechanism by which information may travel between client computers 103-105 and another computer, network, a cloud-based network, a cloud instance, or the like.

Network 110 is configured to couple network computers with other computers, including, service developer computer 116, service platform computer 118, service platform computer 120, client computers 102-105 through wireless network 108, or the like. Network 110 is enabled to employ any form of computer readable media for communicating information from one electronic device to another. Also, network 110 can include the Internet in addition to local area networks (LANs), wide area networks (WANs), direct connections, such as through a universal serial bus (USB) port, Ethernet port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, or other carrier mechanisms including, for example, E-carriers, Integrated Services Digital Networks (ISDNs), Digital Subscriber Lines (DSLs), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 110 may be configured to transport information using one or more network protocols, such Internet Protocol (IP).

Additionally, communication media typically embodies computer readable instructions, data structures, program modules, or other transport mechanism and includes any information non-transitory delivery media or transitory delivery media. By way of example, communication media includes wired media such as twisted pair, coaxial cable, fiber optics, wave guides, and other wired media and wireless media such as acoustic, RF, infrared, and other wireless media.

One embodiment of service developer computer 116, service platform computer 118, or service platform computer 120 is described in more detail below in conjunction with FIG. 3. Although FIG. 1 illustrates service developer computer 116, service platform computer 118, service platform computer 120 as a single computer, the innovations or embodiments are not so limited. For example, one or more functions of service developer computer 116, service platform computer 118, service platform computer 120, or the like, may be distributed across one or more distinct network computers. Moreover, in one or more embodiments, service platform computer 116 or service platform computer 118 may be implemented using a plurality of network computers. Further, in one or more of the various embodiments, service developer computer 116, service platform computer 118, service platform computer 120 may be implemented using one or more cloud instances in one or more cloud networks. Accordingly, these innovations and embodiments are not to be construed as being limited to a single environment, and other configurations, and other architectures are also envisaged.

Illustrative Client Computer

Figure 2:
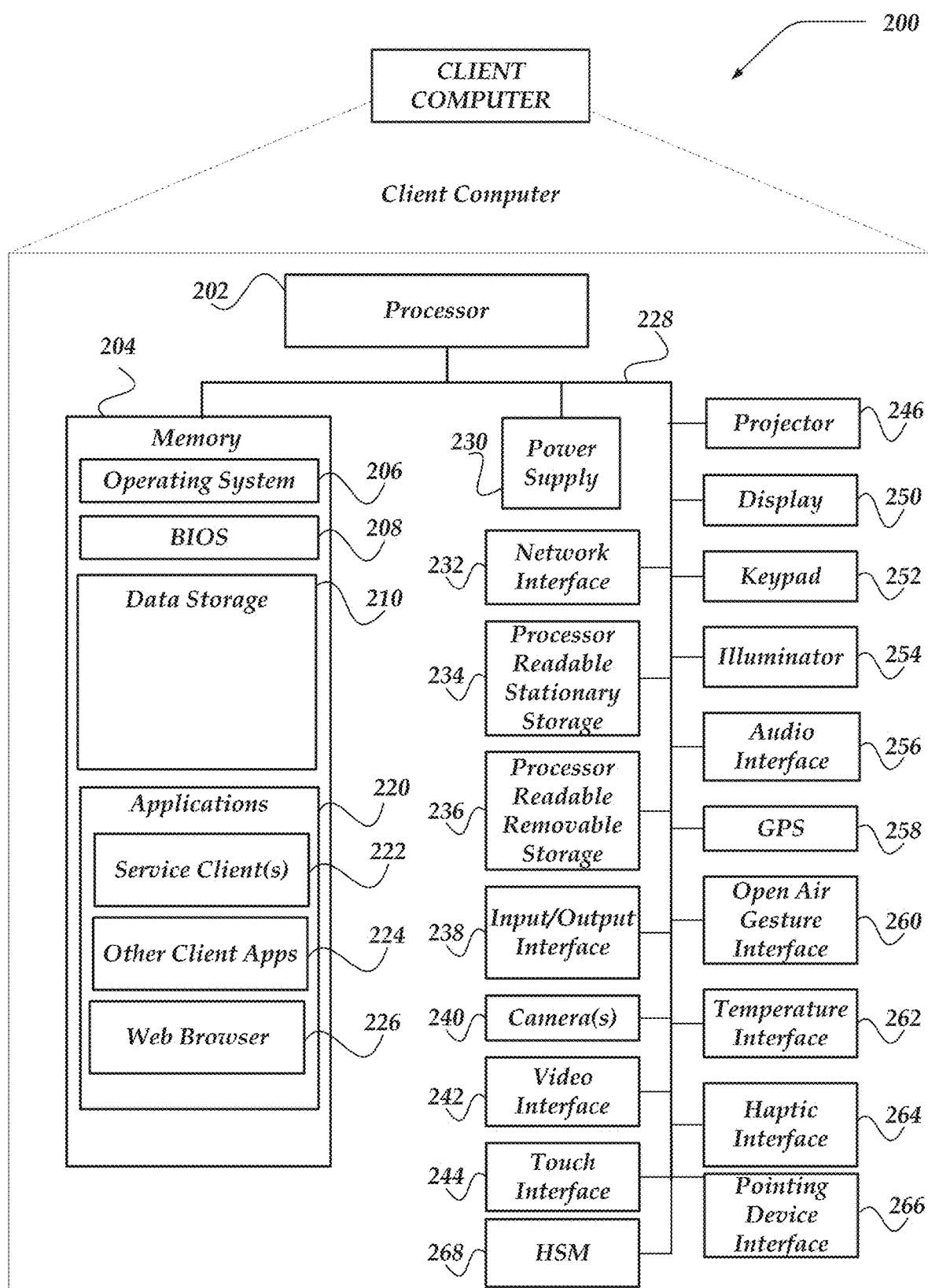
FIG. 2 illustrates a schematic embodiment of a client computer.

FIG. 2 shows one embodiment of client computer 200 that may include many more or less components than those shown. Client computer 200 may represent, for example, at least one embodiment of mobile computers or client computers shown in FIG. 1.

Client computer 200 may include processor 202 in communication with memory 204 via bus 228. Client computer 200 may also include power supply 230, network interface 232, audio interface 256, display 250, keypad 252, illuminator 254, video interface 242, input/output interface 238, haptic interface 264, global positioning systems (GPS) receiver 258, open air gesture interface 260, temperature interface 262, camera(s) 240, projector 246, pointing device interface 266, processor-readable stationary storage device 234, and processor-readable removable storage device 236. Client computer 200 may optionally communicate with a base station (not shown), or directly with another computer.

And in one embodiment, although not shown, a gyroscope may be employed within client computer 200 for measuring or maintaining an orientation of client computer 200.

Power supply 230 may provide power to client computer 200. A rechargeable or non-rechargeable battery may be used to provide power. The power may also be provided by an external power source, such as an AC adapter or a powered docking cradle that supplements or recharges the battery.

Network interface 232 includes circuitry for coupling client computer 200 to one or more networks, and is constructed for use with one or more communication protocols and technologies including, but not limited to, protocols and technologies that implement any portion of the OSI model for mobile communication (GSM), CDMA, time division multiple access (TDMA), UDP, TCP/IP, SMS, MMS, GPRS, WAP, UWB, WiMax, SIP/RTP, GPRS, EDGE, WCDMA, LTE, UMTS, OFDM, CDMA2000, EV-DO, HSDPA, or any of a variety of other wireless communication protocols. Network interface 232 is sometimes known as a transceiver, transceiving device, or network interface card (MC).

Audio interface 256 may be arranged to produce and receive audio signals such as the sound of a human voice. For example, audio interface 256 may be coupled to a speaker and microphone (not shown) to enable telecommunication with others or generate an audio acknowledgement for some action. A microphone in audio interface 256 can also be used for input to or control of client computer 200, e.g., using voice recognition, detecting touch based on sound, and the like.

Display 250 may be a liquid crystal display (LCD), gas plasma, electronic ink, light emitting diode (LED), Organic LED (OLED) or any other type of light reflective or light transmissive display that can be used with a computer. Display 250 may also include a touch interface 244 arranged to receive input from an object such as a stylus or a digit from a human hand, and may use resistive, capacitive, surface acoustic wave (SAW), infrared, radar, or other technologies to sense touch or gestures.

Projector 246 may be a remote handheld projector or an integrated projector that is capable of projecting an image on a remote wall or any other reflective object such as a remote screen.

Video interface 242 may be arranged to capture video images, such as a still photo, a video segment, an infrared video, or the like. For example, video interface 242 may be coupled to a digital video camera, a web-camera, or the like. Video interface 242 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 252 may comprise any input device arranged to receive input from a user. For example, keypad 252 may include a push button numeric dial, or a keyboard. Keypad 252 may also include command buttons that are associated with selecting and sending images.

Illuminator 254 may provide a status indication or provide light. Illuminator 254 may remain active for specific periods of time or in response to event messages. For example, when illuminator 254 is active, it may backlight the buttons on keypad 252 and stay on while the client computer is powered. Also, illuminator 254 may backlight these buttons in various patterns when particular actions are performed, such as dialing another client computer. Illuminator 254 may also cause light sources positioned within a transparent or translucent case of the client computer to illuminate in response to actions.

Further, client computer 200 may also comprise hardware security module (HSM) 268 for providing additional tamper resistant safeguards for generating, storing or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, or store keys pairs, or the like. In some embodiments, HSM 268 may be a stand-alone computer, in other cases, HSM 268 may be arranged as a hardware card that may be added to a client computer.

Client computer 200 may also comprise input/output interface 238 for communicating with external peripheral devices or other computers such as other client computers and network computers. The peripheral devices may include an audio headset, virtual reality headsets, display screen glasses, remote speaker system, remote speaker and microphone system, and the like. Input/output interface 238 can utilize one or more technologies, such as Universal Serial Bus (USB), Infrared, WiFi, WiMax, Bluetooth™, and the like.

Input/output interface 238 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to client computer 200.

Haptic interface 264 may be arranged to provide tactile feedback to a user of the client computer. For example, the haptic interface 264 may be employed to vibrate client computer 200 in a particular way when another user of a computer is calling. Temperature interface 262 may be used to provide a temperature measurement input or a temperature changing output to a user of client computer 200. Open air gesture interface 260 may sense physical gestures of a user of client computer 200, for example, by using single or stereo video cameras, radar, a gyroscopic sensor inside a computer held or worn by the user, or the like. Camera 240 may be used to track physical eye movements of a user of client computer 200.

GPS transceiver 258 can determine the physical coordinates of client computer 200 on the surface of the Earth, which typically outputs a location as latitude and longitude values. GPS transceiver 258 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client computer 200 on the surface of the Earth. It is understood that under different conditions, GPS transceiver 258 can determine a physical location for client computer 200. In one or more embodiments, however, client computer 200 may, through other components, provide other information that may be employed to determine a physical location of the client computer, including for example, a Media Access Control (MAC) address, IP address, and the like.

Human interface components can be peripheral devices that are physically separate from client computer 200, allowing for remote input or output to client computer 200. For example, information routed as described here through human interface components such as display 250 or keyboard 252 can instead be routed through network interface 232 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth™, Zigbee™ and the like. One non-limiting example of a client computer with such peripheral human interface components is a wearable computer, which might include a remote pico projector along with one or more cameras that remotely communicate with a separately located client computer to sense a user's gestures toward portions of an image projected by the pico projector onto a reflected surface such as a wall or the user's hand.

A client computer may include web browser application 226 that is configured to receive and to send web pages, web-based messages, graphics, text, multimedia, and the like. The client computer's browser application may employ virtually any programming language, including a wireless application protocol messages (WAP), and the like. In one or more embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, and the like.

Memory 204 may include RAM, ROM, or other types of memory. Memory 204 illustrates an example of computer-readable storage media (devices) for storage of information such as computer-readable instructions, data structures, program modules or other data. Memory 204 may store BIOS 208 for controlling low-level operation of client computer 200. The memory may also store operating system 206 for controlling the operation of client computer 200. It will be appreciated that this component may include a general-purpose operating system such as a version of UNIX®, or Linux®, or a specialized client computer communication operating system such as Windows Phone™, or the Symbian® operating system. The operating system may include, or interface with a Java virtual machine module that enables control of hardware components or operating system operations via Java application programs.

Memory 204 may further include one or more data storage 210, which can be utilized by client computer 200 to store, among other things, applications 220 or other data. For example, data storage 210 may also be employed to store information that describes various capabilities of client computer 200. The information may then be provided to another device or computer based on any of a variety of methods, including being sent as part of a header during a communication, sent upon request, or the like. Data storage 210 may also be employed to store social networking information including address books, buddy lists, aliases, user profile information, or the like. Data storage 210 may further include program code, data, algorithms, and the like, for use by a processor, such as processor 202 to execute and perform actions. In one embodiment, at least some of data storage 210 might also be stored on another component of client computer 200, including, but not limited to, non-transitory processor-readable removable storage device 236, processor-readable stationary storage device 234, or even external to the client computer.

Applications 220 may include computer executable instructions which, when executed by client computer 200, transmit, receive, or otherwise process instructions and data. Applications 220 may include, for example, service clients 222, other client applications 224, web browser 226, or the like. Client computers may be arranged to exchange communications, such as, queries, searches, messages, notification messages, event messages, alerts, performance metrics, log data, API calls, or the like, combination thereof, with healthcare service platforms. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth.

Additionally, in one or more embodiments (not shown in the figures), client computer 200 may include one or more embedded logic hardware devices instead of CPUs, such as, an Application Specific Integrated Circuit (ASIC), Field Programmable Gate Array (FPGA), Programmable Array Logic (PAL), or the like, or combination thereof. The embedded logic hardware devices may directly execute embedded logic to perform actions. Also, in one or more embodiments (not shown in the figures), client computer 200 may include one or more hardware microcontrollers instead of CPUs. In one or more embodiments, the microcontrollers may directly execute their own embedded logic to perform actions and access their own internal memory and their own external Input and Output Interfaces (e.g., hardware pins or wireless transceivers) to perform actions, such as System On a Chip (SOC), or the like.

Illustrative Network Computer

Figure 3:
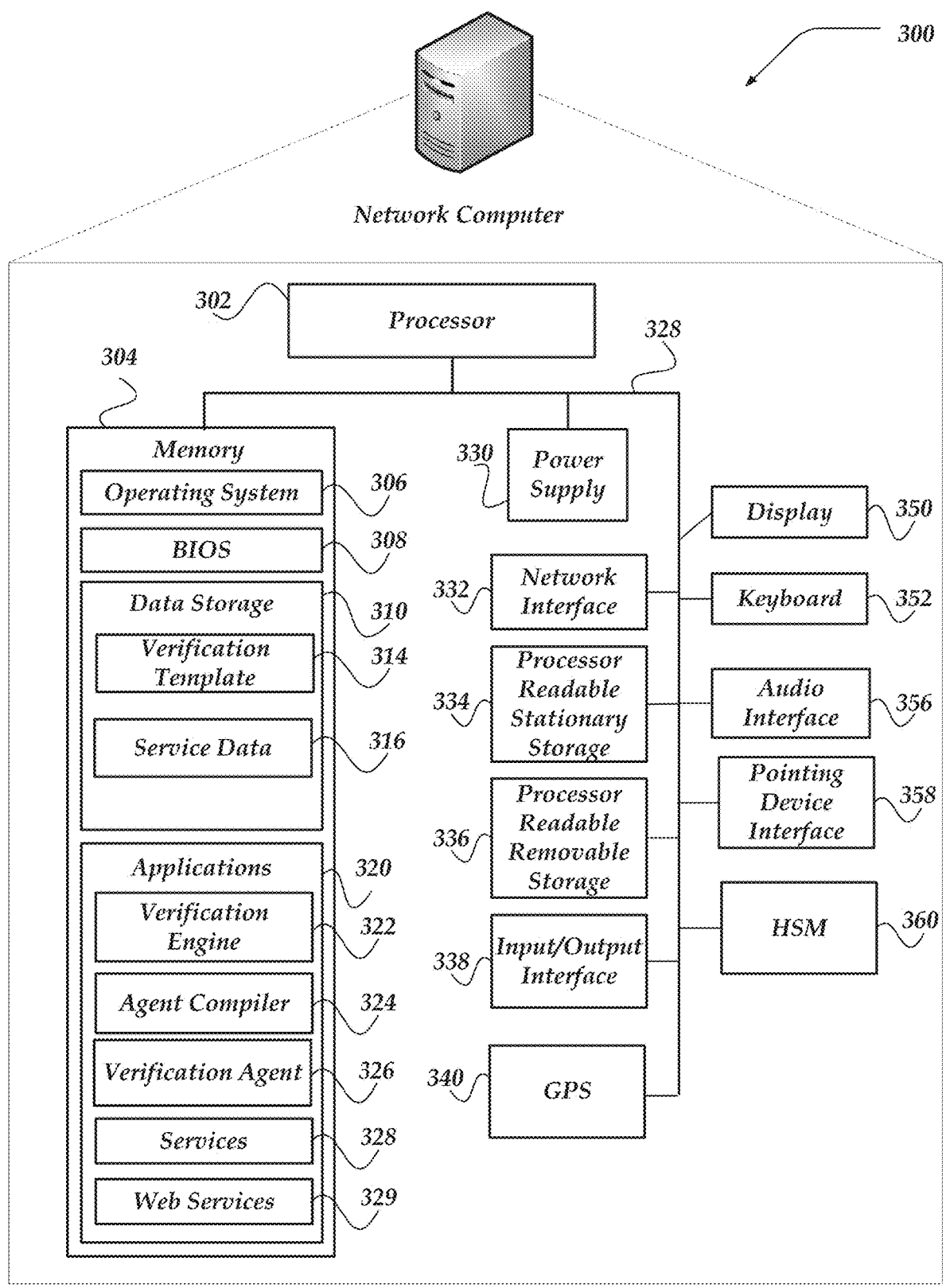
FIG. 3 illustrates a schematic embodiment of a network computer.

FIG. 3 shows one embodiment of network computer 300 that may be included in a system implementing at least one of the various embodiments. Network computer 300 may include many more or less components than those shown in FIG. 3. However, the components shown are sufficient to disclose an illustrative embodiment for practicing these innovations. Network computer 300 may represent, for example, one embodiment of service developer computer 116, service platform computer 118, or service platform computer 120 of FIG. 1.

As shown in the figure, network computer 300 includes a processor 302 that may be in communication with a memory 304 via a bus 328. In some embodiments, processor 302 may be comprised of one or more hardware processors, or one or more processor cores. In some cases, one or more of the one or more processors may be specialized processors designed to perform one or more specialized actions, such as, those described herein. Network computer 300 also includes a power supply 330, network interface 332, audio interface 356, display 350, keyboard 352, input/output interface 338, processor-readable stationary storage device 334, and processor-readable removable storage device 336. Power supply 330 provides power to network computer 300.

Network interface 332 includes circuitry for coupling network computer 300 to one or more networks, and is constructed for use with one or more communication protocols and technologies including, but not limited to, protocols and technologies that implement any portion of the Open Systems Interconnection model (OSI model), global system for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), WAP, ultra-wide band (UWB), IEEE 802.16 Worldwide Interoperability for Microwave Access (WiMax), Session Initiation Protocol/Realtime Transport Protocol (SIP/RTP), or any of a variety of other wired and wireless communication protocols. Network interface 332 is sometimes known as a transceiver, transceiving device, or network interface card (NIC). Network computer 300 may optionally communicate with a base station (not shown), or directly with another computer.

Audio interface 356 is arranged to produce and receive audio signals such as the sound of a human voice. For example, audio interface 356 may be coupled to a speaker and microphone (not shown) to enable telecommunication with others or generate an audio acknowledgement for some action. A microphone in audio interface 356 can also be used for input to or control of network computer 300, for example, using voice recognition.

Display 350 may be a liquid crystal display (LCD), gas plasma, electronic ink, light emitting diode (LED), Organic LED (OLED) or any other type of light reflective or light transmissive display that can be used with a computer. In some embodiments, display 350 may be a handheld projector or pico projector capable of projecting an image on a wall or other object.

Network computer 300 may also comprise input/output interface 338 for communicating with external devices or computers not shown in FIG. 3. Input/output interface 338 can utilize one or more wired or wireless communication technologies, such as USB™, Firewire™, WiFi, WiMax, Thunderbolt™, Infrared, Bluetooth™, Zigbee™, serial port, parallel port, and the like.

Also, input/output interface 338 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to network computer 300. Human interface components can be physically separate from network computer 300, allowing for remote input or output to network computer 300. For example, information routed as described here through human interface components such as display 350 or keyboard 352 can instead be routed through the network interface 332 to appropriate human interface components located elsewhere on the network. Human interface components include any component that allows the computer to take input from, or send output to, a human user of a computer. Accordingly, pointing devices such as mice, styluses, track balls, or the like, may communicate through pointing device interface 358 to receive user input.

GPS transceiver 340 can determine the physical coordinates of network computer 300 on the surface of the Earth, which typically outputs a location as latitude and longitude values. GPS transceiver 340 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of network computer 300 on the surface of the Earth. It is understood that under different conditions, GPS transceiver 340 can determine a physical location for network computer 300. In one or more embodiment, however, network computer 300 may, through other components, provide other information that may be employed to determine a physical location of the client computer, including for example, a Media Access Control (MAC) address, IP address, and the like.

In at least one of the various embodiments, applications, such as, operating system 306, verification engine 322, agent compiler 324, verification agent 326, services 328, web services 329, or the like, may be arranged to employ geo-location information to select one or more localization features, such as, time zones, languages, currencies, calendar formatting, or the like. Localization features may be used when scheduling/visit information, provider availability, patient preferences, user-interfaces, generating reports, as well as internal processes or databases. In at least one of the various embodiments, geo-location information used for selecting localization information may be provided by GPS 340. Also, in some embodiments, geolocation information may include information provided using one or more geo-location protocols over the networks, such as, wireless network 108 or network 111.

Memory 304 may include Random Access Memory (RAM), Read-Only Memory (ROM), or other types of memory. Memory 304 illustrates an example of computer-readable storage media (devices) for storage of information such as computer-readable instructions, data structures, program modules or other data. Memory 304 stores a basic input/output system (BIOS) 308 for controlling low-level operation of network computer 300. The memory also stores an operating system 306 for controlling the operation of network computer 300. It will be appreciated that this component may include a general-purpose operating system such as a version of UNIX, or Linux®, or a specialized operating system such as Microsoft Corporation's Windows® operating system, or the Apple Corporation's IOS® operating system. The operating system may include, or interface with a Java virtual machine (JVM) or other run-time engines that enable control of hardware components or operating system operations via application programs executed the JVM or other run-time execution engines.

Memory 304 may further include one or more data storage 310, which can be utilized by network computer 300 to store, among other things, applications 320 or other data. For example, data storage 310 may also be employed to store information that describes various capabilities of network computer 300. The information may then be provided to another device or computer based on any of a variety of methods, including being sent as part of a header during a communication, sent upon request, or the like. Data storage 310 may also be employed to store social networking information including address books, buddy lists, aliases, user profile information, or the like. Data storage 310 may further include program code, data, algorithms, and the like, for use by a processor, such as processor 302 to execute and perform actions such as those actions described below. In one embodiment, at least some of data storage 310 might also be stored on another component of network computer 300, including, but not limited to, non-transitory media inside processor-readable removable storage device 336, processor-readable stationary storage device 334, or any other computer-readable storage device within network computer 300, or even external to network computer 300. Data storage 310 may include, for example, verification templates 314, service data 316, or the like.

Applications 320 may include computer executable instructions which, when executed by network computer 300, transmit, receive, or otherwise process messages (e.g., SMS, Multimedia Messaging Service (MMS), Instant Message (IM), email, or other messages), audio, video, and enable telecommunication with another user of another mobile computer. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth. Applications 320 may include verification engine 322, agent compiler 324, verification agent 326, services 328, web services 329, or the like, that may be arranged to perform actions for embodiments described below. In one or more of the various embodiments, one or more of the applications may be implemented as modules or components of another application. Further, in one or more of the various embodiments, applications may be implemented as operating system extensions, modules, plugins, or the like.

Furthermore, in one or more of the various embodiments, verification engine 322, agent compiler 324, verification agent 326, services 328, web services 329, or the like, may be operative in a cloud-based computing environment. In one or more of the various embodiments, these applications, and others, that comprise a service platform may be executing within virtual machines or virtual servers that may be managed in a cloud-based based computing environment. In one or more of the various embodiments, in this context the applications may flow from one physical network computer within the cloud-based environment to another depending on performance and scaling considerations automatically managed by the cloud computing environment. Likewise, in one or more of the various embodiments, virtual machines or virtual servers dedicated to verification engine 322, agent compiler 324, verification agent 326, services 328, web services 329, or the like, may be provisioned and de-commissioned automatically.

Also, in one or more of the various embodiments, verification engine 322, agent compiler 324, verification agent 326, services 328, web services 329, or the like, may be located in virtual servers running in a cloud-based computing environment rather than being tied to one or more specific physical network computers. Likewise, in some embodiments, one or more of verification engine 322, agent compiler 324, verification agent 326, services 328, web services 329, or the like, may be configured to execute in a container-based environment.

Further, network computer 300 may also comprise hardware security module (HSM) 360 for providing additional tamper resistant safeguards for generating, storing or using security/cryptographic information such as, keys, digital certificates, passwords, passphrases, two-factor authentication information, or the like. In some embodiments, hardware security modules may be employed to support one or more standard public key infrastructures (PKI), and may be employed to generate, manage, or store keys pairs, or the like. In some embodiments, HSM 360 may be a stand-alone network computer, in other cases, HSM 360 may be arranged as a hardware card that may be installed in a network computer.

Additionally, in one or more embodiments (not shown in the figures), network computer 300 may include one or more embedded logic hardware devices instead of CPUs, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), the network computer may include one or more hardware microcontrollers instead of CPUs. In one or more embodiments, the one or more microcontrollers may directly execute their own embedded logic to perform actions and access their own internal memory and their own external Input and Output Interfaces (e.g., hardware pins or wireless transceivers) to perform actions, such as System On a Chip (SOC), or the like.

Illustrative Logical System Architecture

Figure 4:
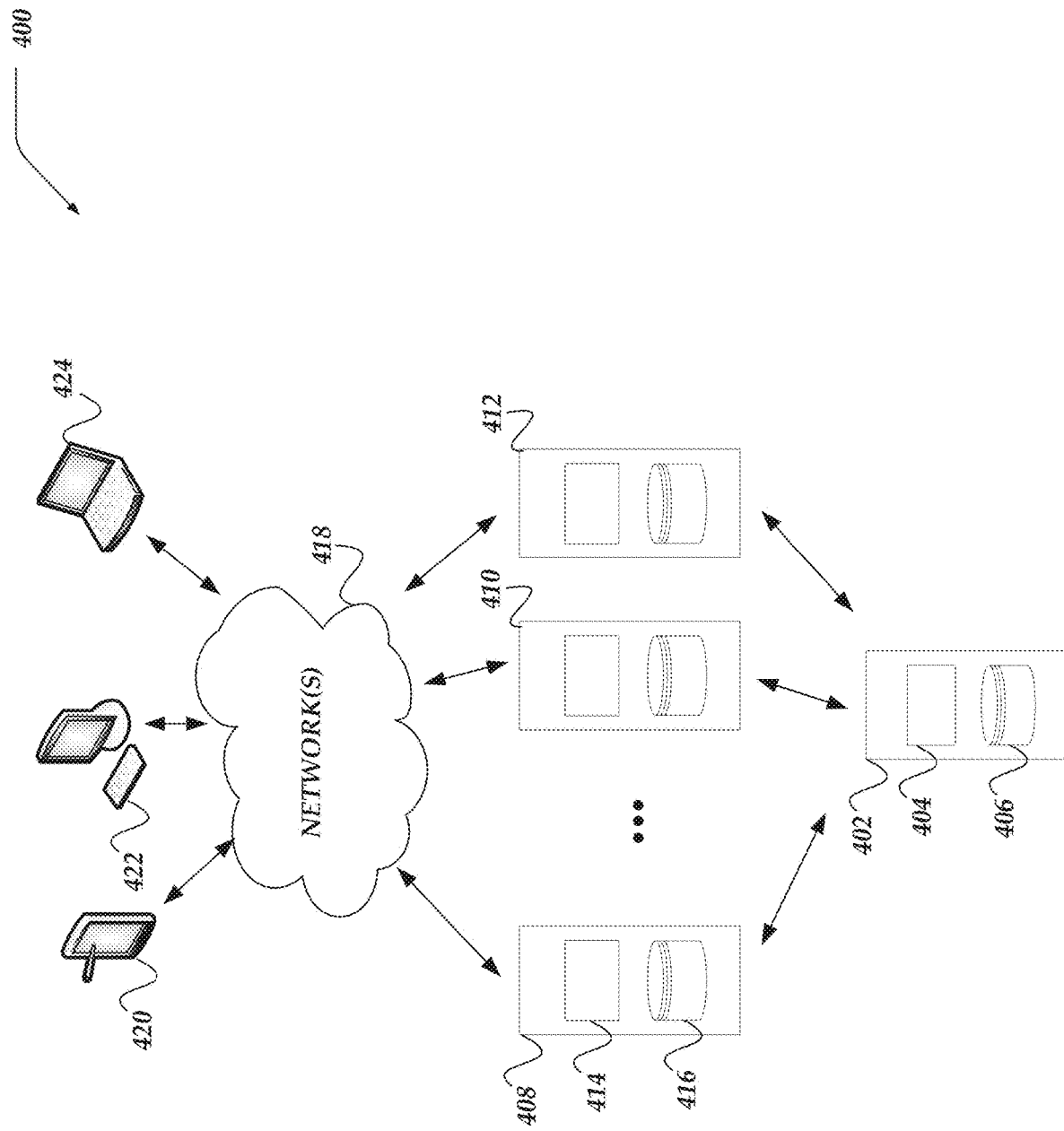
FIG. 4 illustrates a logical schematic of a system for verifying performance and operation of live services in accordance with one or more of the various embodiments.

FIG. 4 illustrates a logical schematic of system 400 for verifying performance and operation of live services in accordance with one or more of the various embodiments. In some embodiments, systems such as system 400 may comprise: one or more service developer computers, such as, service developer environment 402; one or more service platform computers, such as, customer environment 408, customer environment 410, customer environment 412, client computer 420, client computer 422, client computer 424, or the like, that may be communicatively coupled via one or more networks, such as, network 418.

In some embodiments, service developer environment 402 may be considered a development environment for a software service provider that provides one or more services or applications to one or more customers. In some embodiments, developer environments may comprise one or more network computers that may be running in cloud-based environments, on-premise environments, data centers, or the like, or combination thereof. In some embodiments, developer environments, such as, developer environment 402 may include one or more processes or compute instances, represented here by compute environment 404. Also, in some embodiments, developer environments may include one or more storage systems, such as, data store 406.

Also, in some embodiments, customer environments, such as, customer environment 408, or the like, may include one or more processes or compute instances, such as, compute environment 414. Also, in some embodiments, customer environments may include one or more storage systems, such as, data store 416.

In this example, for some embodiments, compute environments may be considered cloud-based network computers, physical network computers, or combination thereof.

In one or more of the various embodiments, customer environments may be configured to support different customers that may be running applications or services provided by a software service provider. In some embodiments, the different customers may be running the same or similar services that may be provided by the same provider.

In some embodiments, storage systems for each customer environment may store information or data specific to individual customers. For example, if the customers may be healthcare providers, patient lists, treatment histories, provider schedules, or the like, may be unique or distinct for different healthcare providers. Accordingly, in this example, each customer may have distinct data stores.

Also, in some embodiments, different customers may employ one or more different features of services or applications provided by the developer. Thus, in some embodiments, different customers may require different configurations for the same service or application. Also, in some embodiments, different customers may require one or more different custom features that may be unique.

In one or more of the various embodiments, as new services, new versions of existing services, or new features for existing services may be developed, developers of software services may automatically or manually deploy the updates to the one or more customers that may be eligible to receive the updates. Accordingly, in some embodiments, developers may perform various actions to verify that the new services, new versions of existing services, or new features meet customer requirements or avoid software defects.

In some cases, some verification/validation testing may occur before service updates may be deployment to customers. However, in some cases, for some embodiments, service updates may require validation or verification in the customer's computing environment for various reasons, such as, dependencies on local/live data, verification that updated services work as expected with the particular configuration for each customer, or the like.

Conventionally, service performance or service operations may be verified by running one or more scripts that exercise various features of the service. Accordingly, in some cases, if customers have different requirements or different configurations, different test scripts may be required for each customer. In some conventional systems, service developers may manually generate customer scripts for each customer. However, such practice may be disadvantageous as the number of customers increase or the number of features in the services increase. For example, it may be that a linear increase in features, customers, or customer configurations may result in exponential increases in the number of conditions or circumstances that may require testing or verification.

Accordingly, in some embodiments, developers may employ verification engines to provide verification templates that may be compiled to provide verification agents that may be executed for each unique customer or configuration environment. In some embodiments, verification templates may declare one or more verification operations that may be compiled by agent compilers into verification agents that are adapted to the specific service environment or configuration for individual customers.

Figure 5:
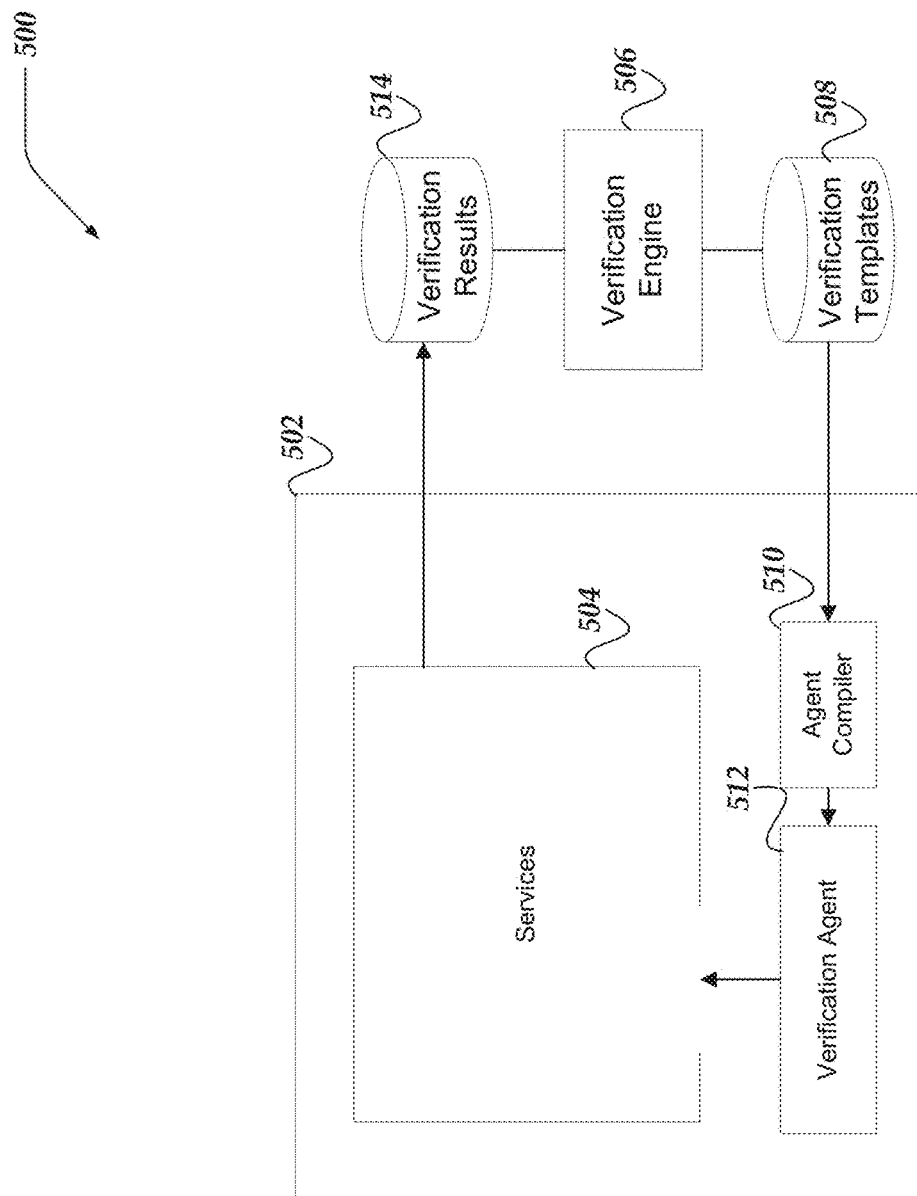
FIG. 5 illustrates a logical schematic of a system for verifying performance and operation of live services in accordance with one or more of the various embodiments.

FIG. 5 illustrates a logical schematic of system 500 for verifying performance and operation of live services in accordance with one or more of the various embodiments. As described above, verification engines, such as, verification engine 506 may provide one or more verification templates, such as, verification templates 508, that may be compiled by agent compilers, such as, agent compiler 510, into one or more verification agents, such as, verification agent 512. Accordingly, in some embodiments, verification agents may be arranged to execute one or more verification operations to verify if one or more services, such as, services 504, may be operating within requirements. In some embodiments, verification engines may be arranged to collect verification results for providing one or more reports.

In this example, for some embodiments, customer environment 502 represents a computing environment that executes or hosts one or more services provided by a developer for a particular customer. In some cases, customer environments may be hosted in cloud computing environments, data centers, on-premises servers, or the like. In some cases, customer environments may be hosted on network computers that are under the control of the service provider/developer, such as, services may be provided as remotely accessible software-as-a-service (SaaS) services. In other cases, for some embodiments, customer environments may be managed by the customers themselves. One of ordinary skill in the art will appreciate that various distribution of responsibilities, deployment options (e.g., physical environments, cloud environments, hybrid computing environments, or the like) may be employed without departing from the scope of the innovations disclosed herein. Generally, the different types of service deployments (SaaS, local installations, cloud computing, on-premises, or the like) may be considered configuration options that may be resolved using verification templates.

Figure 6:
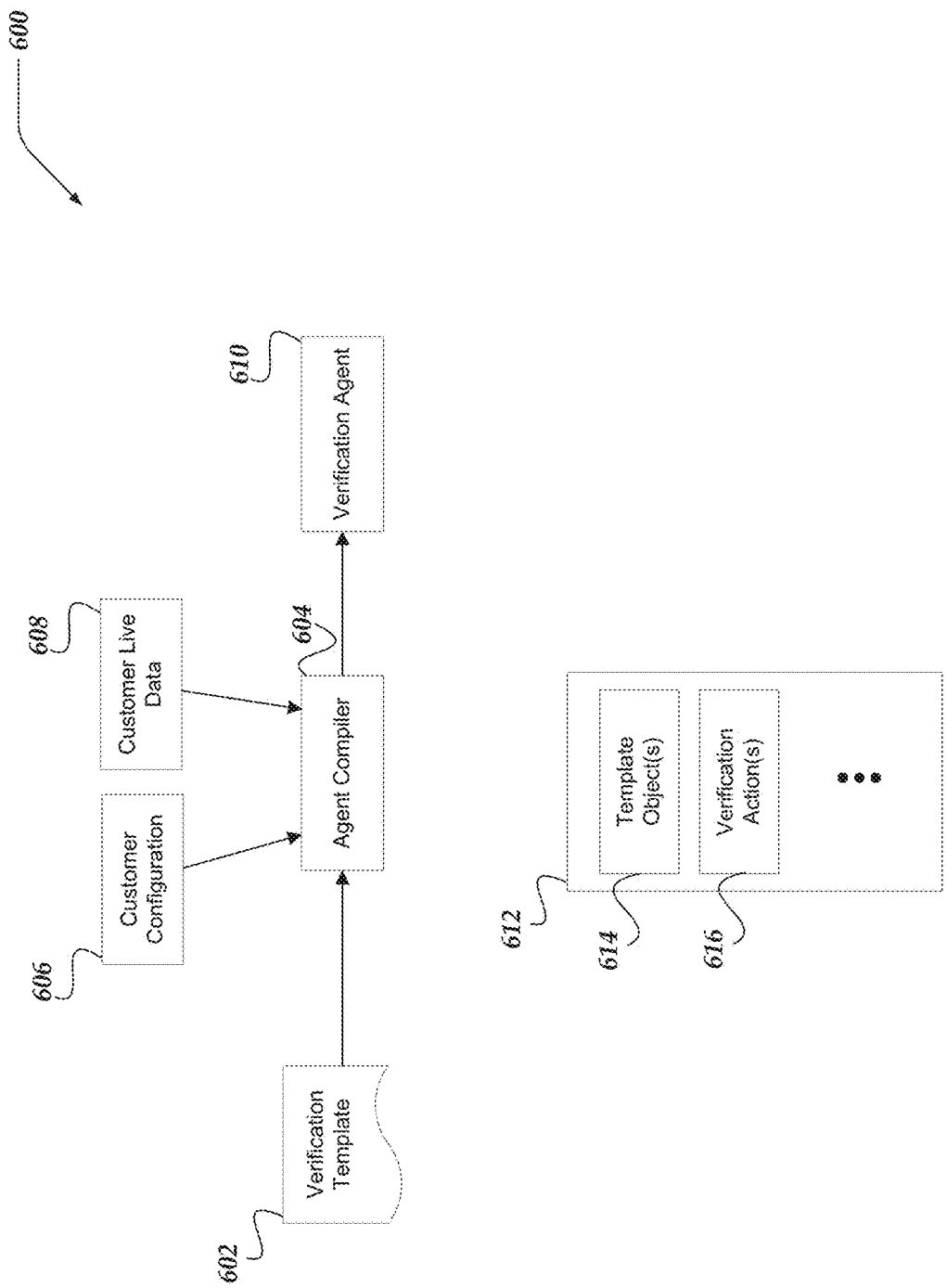
FIG. 6 illustrates a logical schematic of a system for verifying performance and operation of live services in accordance with one or more of the various embodiments.

FIG. 6 illustrates a logical schematic of system 600 for verifying performance and operation of live services in accordance with one or more of the various embodiments. As described above, verification engines may be arranged to provide a verification template, such as, verification template 602 to an agent compiler, such as, agent compiler 604. Accordingly, in some embodiments, agent compiler 604 may be arranged to communicate with one or more data stores, external service APIs, internal service APIs, or the like. In this example, customer configuration 606 and customer live data store 608 may be considered to represent the one or more data stores, external service APIs, internal service APIs, or the like, that may provide information that agent compiler 604 may employ (along with verification template 602) to generate verification agent 610.

Further, in some embodiments, agent compilers may be integrated with one or more testing frameworks or platform, including testing platforms that enable programmatic interaction/manipulation of sources that may provide graphical user-interfaces. Accordingly, agent compilers may be arranged to incorporate information associated with graphical user-interfaces if generating verification agents. In one or more of the various embodiments, verification agents, such as, verification agent 610 may include code modules, instructions, or scripts that may be specifically targeted for verifying one or more functional requirements or performance requirements for a particular customer.

In one or more of the various embodiments, verification templates, such as, verification template 602 or verification template 612 may declare one or more template objects, such as, template object(s) 614. Also, in some embodiments, verification templates may declare one or more verification actions, such as, verification agents 616.

In one or more of the various embodiments, template objects may represent various entities for a given service. For example, if a developer is providing a healthcare related service (e.g., healthcare practice management, remote visit platform, or the like), verification templates may include template objects such as customers, patients, physicians, clinics, electronic medical records (EMRs), or the like. And, in some embodiments, verification actions may represent the particular tests, conditionals, success/failure criteria, tests, or the like, that the verification template may be directed to exercising.

Often verifying performance and operation of live services may require tests or other verification actions to be performed using data, configuration information, or the like, that may be specific to a customer environment. For example, continuing with the healthcare service example, one or more verification tests may include verification tests to test/confirm one or more characteristics of patients, healthcare providers, or the like.

In some embodiments, collecting information for different customers may require interfacing with one or more different data sources, such as, different data stores, different internal services, different external services, or the like. Also, in some embodiments, different customers may use different features of the same service. Accordingly, in some embodiments, testing features of the service that a customer may not be using may result in incorrect failure reports. Thus, in some embodiments, agent compilers may be arranged to employ one or more interfaces, libraries, or the like, to collect the information that may be required for a particular customer from one or more live data sources.

In some embodiments, agent compilers may be distributed to customer environments to enable access to information or services that may be local the customer environment. Accordingly, in some embodiments, executing the agent compiler in the customer's environment may enable the agent compiler to collect the appropriate information for generating the verification agent.

Alternatively, in some embodiments, verification engines may execute agent compilers in the developer's environment if the agent compiler has access to the customer information required to generate verification agents. For example, for some embodiments, if the service may be hosted in a cloud computing environment, customer environments may be in a cloud computing environment that may be administered or managed by the software developer. Accordingly, in some embodiments, verification engines or agent compilers may be enabled to access the customer environment/data directly rather than requiring the agent compiler to be hosted or executed within the customer computing environments.

Figure 7:
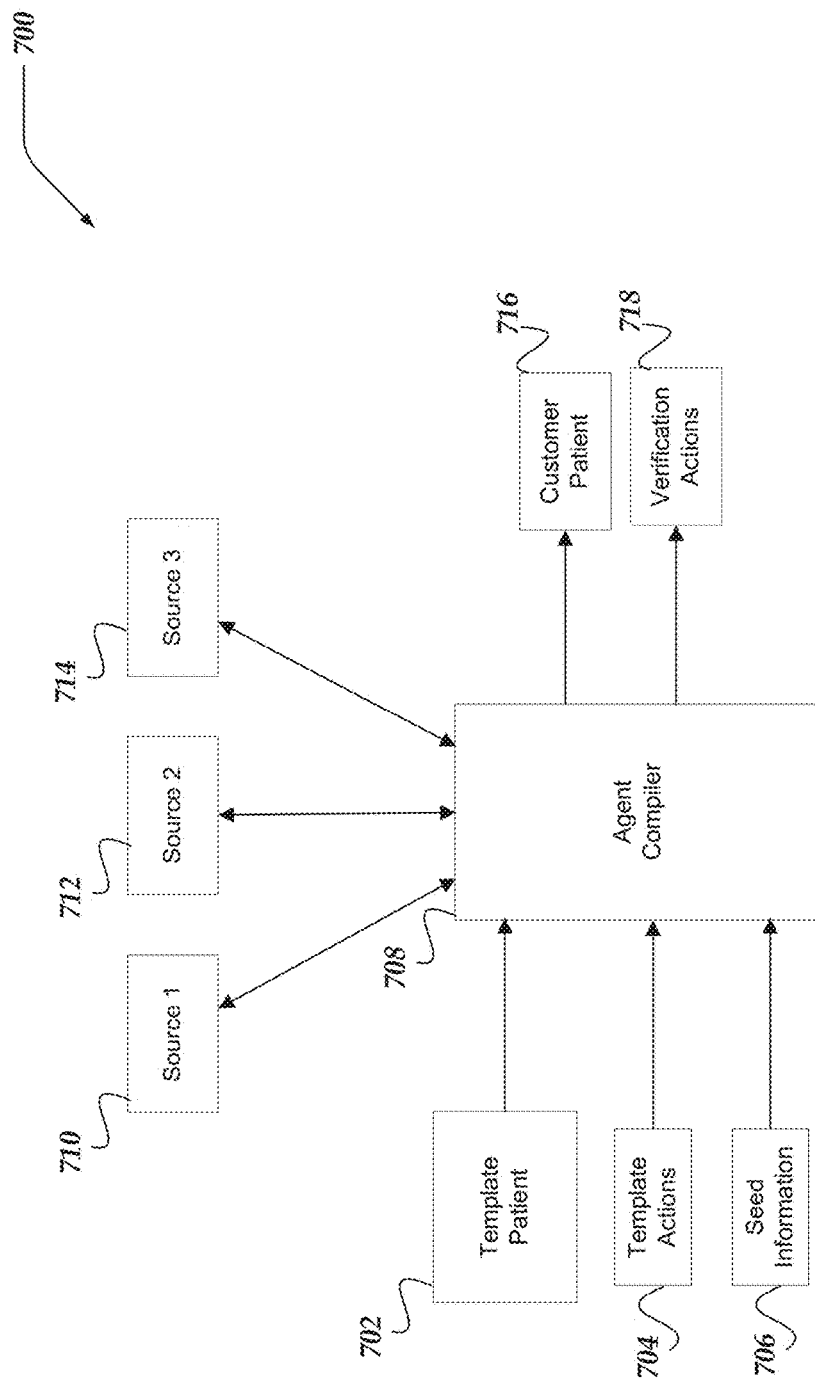
FIG. 7 illustrates a logical schematic of a system for verifying performance and operation of live services in accordance with one or more of the various embodiments.

FIG. 7 illustrates a logical schematic of system 700 for verifying performance and operation of live services in accordance with one or more of the various embodiments. This example, for some embodiments illustrates how a portion of a verification template may be processed by an agent compiler to produce portions of a verification agent.

In this example, system 700 represent a portion of healthcare service platform. In this example, template patient 702 represents a template object declared in a verification template. Here, template patient represents a patient that may be managed by the healthcare service platform.

Also, in this example, template actions represent the verification actions from a verification template. In some embodiments, template actions may be the code or instructions for various tests that may be used to verify one or more features or qualities or the template patient. In some embodiments, template objects may be placeholder objects that require data from the customer's computing environment to instantiate. Accordingly, in some embodiments, template actions may declare the various tests in terms of the template objects.

For example, in some embodiments, a verification template may declare that a patient with one or more particular features should be selected from the patients in the customer's system. Then, for example, the corresponding template actions may be arranged to declare one or more tests for the one or more particular features. However, it may be that the tests cannot be performed unless the template patient is instantiated into an actual patient object.

For example, if the developer would like to verify that patient contact information conforms to one or more formats or other requirements, the tests must be done using patients from the customer's collection of patients rather than mock or generic test data. Likewise, if the verification template includes tests for validated if patient information can be retrieved from the customer's EMR system, the test may be required to fetch patient data from the customer's EMR and validate that the require data has been obtained or formatted properly.

Also, in some embodiments, verification actions may include performing one or more activities that depend on randomized values. For example, for some embodiments, a verification template may declare that ten patients should be selected randomly for a test sequence declared by one or more template actions. In some embodiments, to ensure repeatability for such tests, agent compilers may be arranged to accept seed information, such as, seed information 706 that may be preserved to enable verification actions that use random values to be repeated. In one or more of the various embodiments, seed information, such as, random number generator seed values may be stored with or otherwise included in verification agents. For example, seed information may be embedded in verification agents in meta-data or header fields. Also, in some embodiments, seed information may be embedded in fields associated with the template objects that rely on random values that were generated based on the seed information.

In some embodiments, if template objects may be provided to agent compiler 708, agent compiler 708 may automatically access one or more internal services, external services, data stores, configuration repositories, EMR systems, or the like, to populate (of inflate) template objects into verification objects. In this example, source 710, source 712, and source 714 represent different graphical user-interfaces, APIs, or other interfaces that agent compiler 708 may access to instantiate verification objects from template objects by populating fields or attributes for the object. In some cases, sources may provide graphical or command-line user-interfaces that may be programmatically interacted with to exercise various functions or acquire particular data values that may be used to instantiate one or more objects. One of ordinary skill in the art will appreciate the ready availability of conventional or customized programs that enable automated interaction/exercise of graphical user interfaces. In some cases, such programs may be configured simulate user interactions or acquire data based on values/information that may be displayed in the graphic user interfaces of some sources. For example, in some embodiments, one or more programs may be configured to simulate keypresses or mouse-clicks (e.g., user input) that may be directed to a user-interface of one or more customer data sources. Likewise, for example, the one or more programs may be enabled to capture data or responses associated with the simulated user input. In some cases, some programs may be enabled to 'screen scrape' user-interfaces to collect data or in some cases, such programs may be enabled capture directly from network traffic that may be associated with data source responses.

In one or more of the various embodiments, verification engines may be arranged to enable agent compilers to select the correct interface based on configuration information associated with the customer. For example, customer configuration information may include a field that indicator the type of EMR or database used by the customer. Accordingly, for example, the agent compiler may select an API based on the type of EMR or database used by the customer.

Also, in some embodiments, verification engines or agent compilers may be arranged to interrogate the customer environment to determine one or more environment characteristics that may be used to determine the particular APIs, interfaces, dynamic libraries, or the like, that may be employed to collect the information for generating verification objects from template objects.

In this example, for some embodiments customer patient 716 represents a verification object that has been compiled from the template patient object 702 and information provided from one or more sources. Likewise, in this example, verification actions 718 represent instructions, rules, tests, or the like, that may be declared in the verification template as part of template actions 704.

Generalized Operations

FIGS. 8-11 represent generalized operations for verifying performance and operation of live services in accordance with one or more of the various embodiments. In one or more of the various embodiments, processes 800, 900, 1000, and 1100 described in conjunction with FIGS. 8-11 may be implemented by or executed by one or more processors on a single network computer, such as network computer 300 of FIG. 3. In other embodiments, these processes, or portions thereof, may be implemented by or executed on a plurality of network computers, such as network computer 300 of FIG. 3. In yet other embodiments, these processes, or portions thereof, may be implemented by or executed on one or more virtualized computers, such as, those in a cloud-based or containerized environment. However, embodiments are not so limited and various combinations of network computers, client computers, or the like may be utilized. Further, in one or more of the various embodiments, the processes described in conjunction with FIGS. 8-11 may be used for verifying performance and operation of live services in accordance with at least one of the various embodiments or architectures such as those described in conjunction with FIGS. 4-7. Further, in one or more of the various embodiments, some or all of the actions performed by processes 800, 900, 1000, and 1100 may be executed in part by verification engine 322, agent compiler 324, verification agent 326, or the like, running on one or more processors of one or more network computers.

Figure 8:
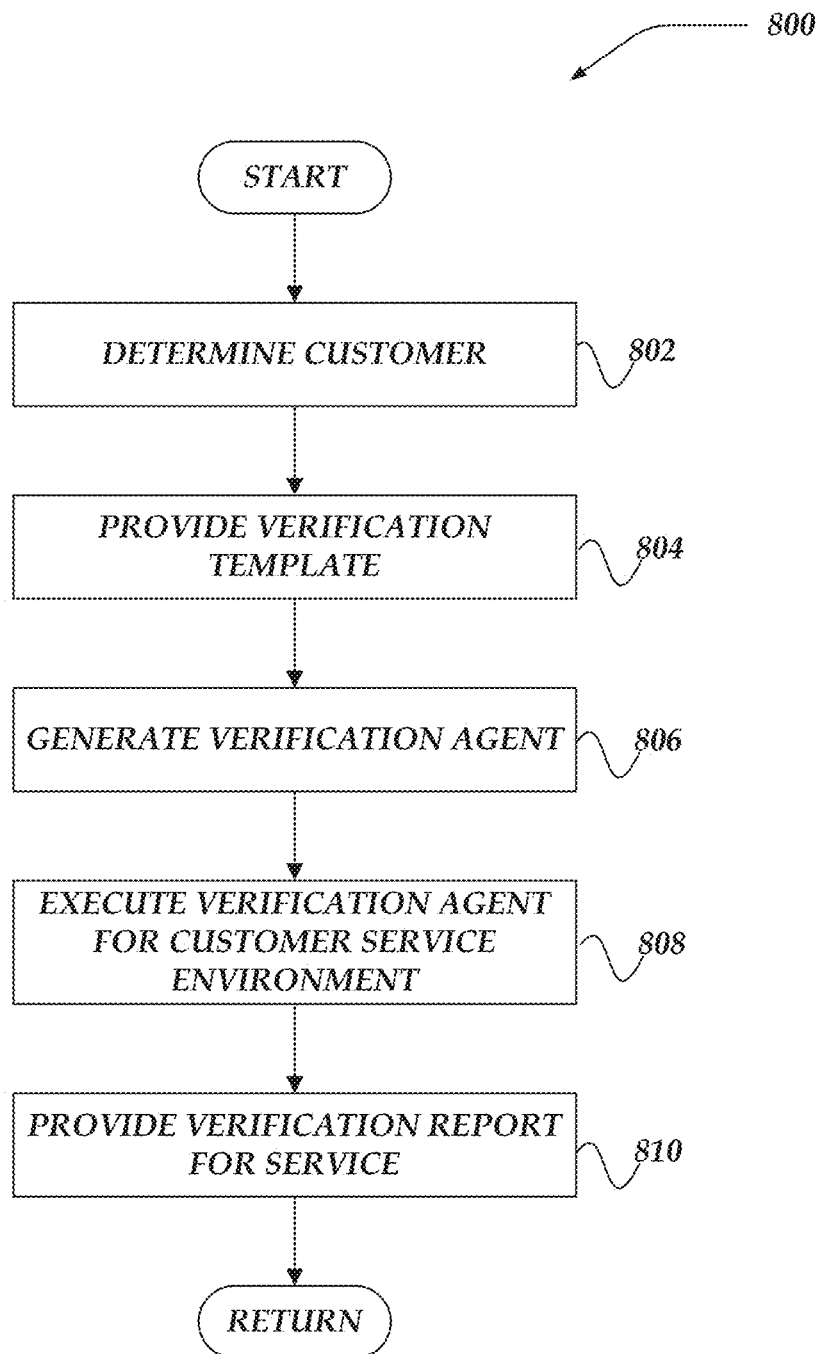
FIG. 8 illustrates an overview flowchart of a process for verifying performance and operation of live services in accordance with one or more of the various embodiments.

FIG. 8 illustrates an overview flowchart of process 800 for verifying performance and operation of live services in accordance with one or more of the various embodiments. After a start block, at block 802, in one or more of the various embodiments, verification engines may be arranged to determine a customer. As described above, service platform may support more than one person or organization herein referred to as customers. In some cases, customers may be external consumers of a service or internal consumers (e.g., customers of internally developed enterprise applications). Accordingly, in some embodiments, organizations that develop or provide services may employ one or more methods for selecting a customer. For example, customers that may be impacted by recent updates may be selected automatically or manually.

At block 804, in one or more of the various embodiments, verification engines may be arranged to provide a verification template. As described above, verification templates may be drafted to address one or more particular features or functions of the service that may be require verification (or testing). In some embodiments, verification templates may comprise one or more programmed template objects that may correspond to objects or entities in the services being verified. For example, a service directed to healthcare practice management may include service objects, such as, patients, physicians, schedules, visits, clinics, or the like. Thus, for this example, a verification template for such a service may include various template objects that correspond to some or all of the service objects.

Also, in some embodiments, verification templates may include one or more template actions that may correspond to various actions that exercise one or more portions of the service being verified. Also, in some embodiments, template actions may include instructions for testing if the service or one or more service objects may meet one or more conditions defined in the verification template.

In one or more of the various embodiments, verification template may be implemented using various computer programming languages, such as, C, C++, Objective-C, Java™, PHP, Perl, Python, JavaScript, Ruby, VBScript, Microsoft .NET™ languages such as C#, or the like. In some cases, for some embodiments customer programming may be employed.

At block 806, in one or more of the various embodiments, verification engines may be arranged to generate a verification agent.

As described above, verification templates that include one or more template objects and one or more template actions may be compiled into verification agents. In some embodiments, agent compilers may be arranged to parse or otherwise interpret the particular computer programming language that comprises a verification template.

Further, in some embodiments, agent compilers may be arranged to execute one or more actions to collect information from customer service environments that may be used during the verification process. In some embodiments, this may include employing one or more APIs/interfaces provided by the service itself. Thus, in some cases, agent compilers may acquire data from live services that are deployed in the customer's service environment. Also, in some embodiments, agent compilers may be arranged to employ one or more other APIs/interfaces to interact with one or more other services (e.g., databases, authentication services, object stores, file repositories, file systems, document management systems, issues tracking systems, task management systems, or the like).

Accordingly, in some embodiments, agent compilers may employ information collected from the service being verified or the one or more other services to instantiate one or more service objects from the one or more template objects. Likewise, in some embodiments, some or all of the information may be employed by verification actions. Accordingly, in some embodiments, agent compilers may be arranged to obtain information from the service being verified based on executing one or more interfaces/APIs or collecting information from user-interfaces based on simulated user-input.

In one or more of the various embodiments, agent compilers may be arranged to execute multiple operations to instantiate service objects. In some embodiments, these operations may vary depending on the customer's service environment. For example, different customers may be using different types of authentication services, credential managers, distributed directory information services, cloud-computing environments, or the like, that may require different protocols for authenticating customers. Accordingly, in this example, agent compilers may be arranged to employ the appropriate protocol based on the service environment to access systems or other services in the customer environment that may be necessary for executing one or more verification actions.

In some circumstances, in some embodiments, agent compilers may be executed in or otherwise hosted within the customers service environment. For example, in some cases, access to other services (e.g., databases, object stores, or the like) may require agent compilers to be running in the customers service environment.

Otherwise, in some embodiments, agent compilers may be executed in a service environment managed or administrated by the service developer. For example, for some embodiments, services being verified may be hosted in a multi-tenant environment such that the customer service environments may be owned or managed by the service developer/provider.

In one or more of the various embodiments, verification agents may be configured to conform to one or more conventional or custom verification (test) frameworks that may be appropriate for verifying performance and operation of live services for a given customer. One of ordinary skill in the art will appreciate that verification frameworks may enable the programmatic execution of tests or other actions to verify one or more declared conditions. Typically, verification frameworks execute one or more script packages that may be produce logs or reports that indicate the success or failure of various tests included in the script packages. Accordingly, in some embodiments, agent compiles may be configured to translate verification objects or verification agents into computer programming languages and script packages suitable for execution by one or more verification frameworks. In some embodiments, agent compilers may be arranged to employ configuration information to determine the target verification frameworks. Thus, in some embodiments, agent compilers may include one or more code generators that translate verification templates to verification agents suitable for particular verification frameworks. Also, in some embodiments, if support for new or additional verification frameworks may be required, agent compilers may be arranged employ one or more parsers, grammars, code generators, or the like, that support the new or additional verification frameworks.

At block 808, in one or more of the various embodiments, verification engines may be arranged to execute the verification agent for the customer's service environment.

Alternatively, in one or more of the various embodiments, verification agents may be arranged to be executed in one or more environments, such as, the service developers' environment, that enable the verification agent to access the data from the live service as required. In some cases, verification agents may be executed in the same servers as the customer's service may be executing. In other circumstances, in some embodiments, verification agents may be arranged to execute in adjacent environments in the same cloud computing environment. Further, in some embodiments, verification agents may be arranged to be executed on the same physical server/network computer as the customer's service.

In some embodiments, deployment of verification agents to particular service environments may be determined based on customer configuration information, or the like. In some cases, for some embodiments, verification templates may include one or more directives that may indicative which service environment may be targeted.

In some embodiments, agent compilers may be configured to run in the target service environment and deliver the verification agent in the same environment that its was compiled in.

In one or more of the various embodiments, verification agents may be targeted to one or more conventional test frameworks that may execute instructions included in the verification agent. Thus, in some embodiments, a particular verification agent may be targeted to a particular test framework.

Also, in some embodiments, verification agents may be injected into one or more deployment pipelines where executing the verification agent is one step/phase of the deployment pipeline. In some cases, compiling verification agents from verification templates may be included such deployment pipelines. In some cases, such deployment pipelines may be referred to as continuous delivery.

At block 810, in one or more of the various embodiments, verification engines may be arranged to provide a verification report for the service. In one or more of the various embodiments, verification templates may declare one or more directives that determine actions that may be taken in response to success or failure of various tests or operations that may occur during the execution of the verification agent.

For example, in some cases, for some embodiments, verification agents may be arranged run silently unless one or more tests or operations fail. Thus, for example, verification agent may be arranged to generate error reports that may be logged or otherwise reported. In some cases, verification agent may be arranged to abort a test run, deployment operations, or the like, if one or more tests or operations may fail.

Also, in some embodiments, verification agents may be arranged to provide status or success reports as well.

In one or more of the various embodiments, the particular types of reporting may be determined based on directives included in the verification templates and capabilities or the testing framework or the customer service environment being verified.

Next, in one or more of the various embodiments, control may be returned to a calling process.

Figure 9:
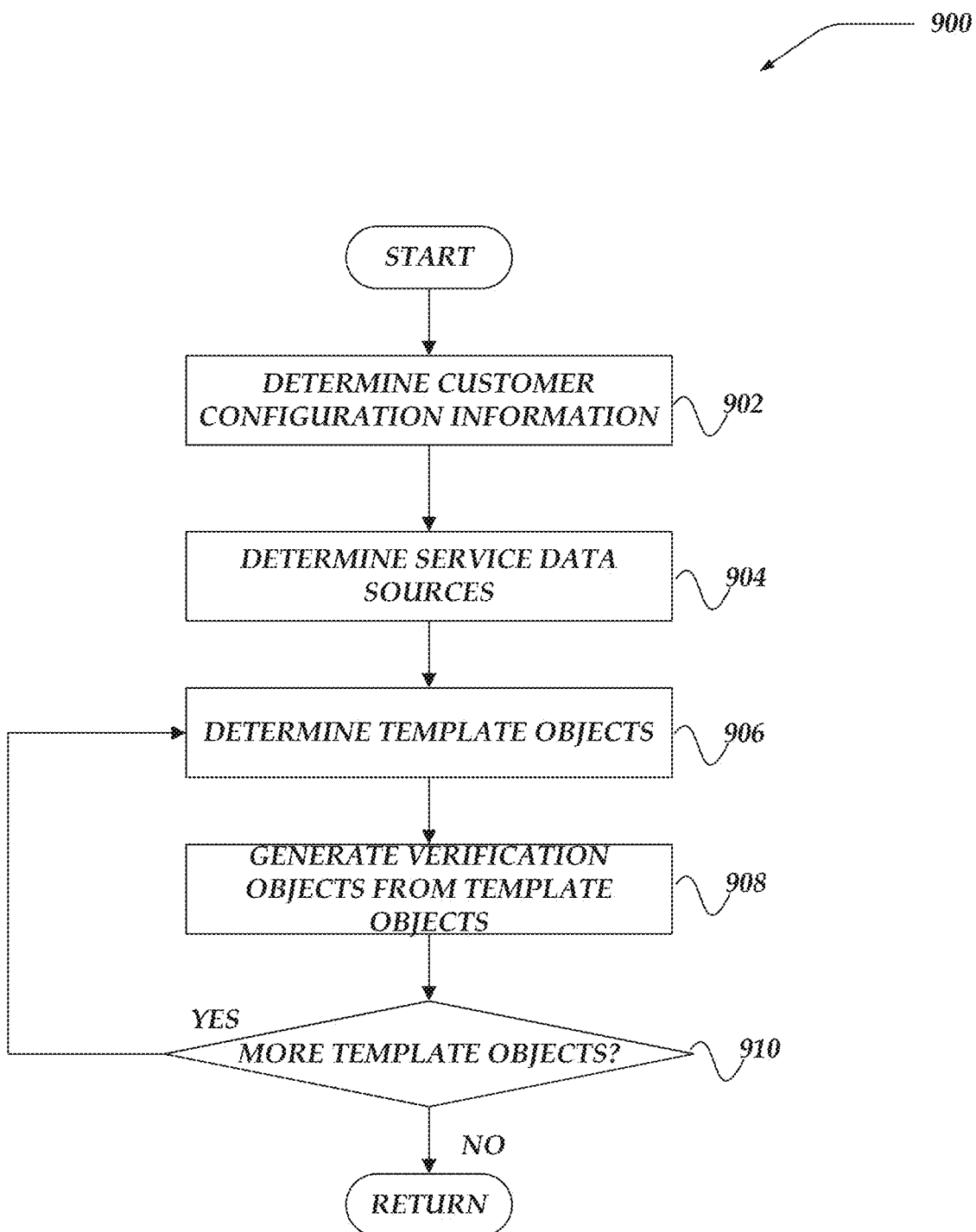
FIG. 9 illustrates a flowchart of a process for verifying performance and operation of live services in accordance with one or more of the various embodiments.

FIG. 9 illustrates a flowchart of process 900 for verifying performance and operation of live services in accordance with one or more of the various embodiments. After a start block, at block 902, in one or more of the various embodiments, verification engines may be arranged to determine configuration information for a customer. In some embodiments, the same verification template may be employed for more than one customer. However, in most cases, for some embodiments, each customer may have one or more unique characteristics, such as, customer name, customer location, service features, service version, security credentials for one or more source APIs, security credentials for service user-interfaces, or the like. Accordingly, in some embodiments, verification templates may include customer configuration sections that declare configuration information for each customer. In some embodiments, agent compilers may be arranged to lookup configuration information from a customer database, or the like, rather than requiring the customer configuration information to be included in the verification template itself.

At block 904, in one or more of the various embodiments, verification engines may be arranged to determine one or more sources of service information. As described above, information used to verify services may be provided via user-interfaces, APIs or other interfaces. In some embodiments, information included in verification template may include tags, labels, instructions, or the like, that may indicate one or more particular mechanisms, routes, users, credential requirements, or the like, that may be required to collect information to generate verification objects or otherwise verify the services undergoing verification. Also, in some embodiments, verification engines may be arranged to acquire customer credentials for one or more source APIs.

In some embodiments, agent compilers may be arranged to employ information such as account name, passwords, pass phrases, security certificates, or the like, to obtain security credentials that may enable the agent compiler to access customer data sources via source APIs.

In some embodiments, agent compilers may be arranged to exercise a handshake that conforms to a specification of one or more credential managers, security repositories, authentication services, or the like. In some embodiments, the customer configuration information may declare the type of credentialing/authorization/authentication system that may be employed. Accordingly, in some embodiments, agent compilers may select execute different protocols depending on the configuration information.

In some embodiments, different sources may require different customer credentials. Accordingly, in some embodiments, agent compilers may communicate with one or more different services or system to obtain customer credentials for different sources.

Note, in some embodiments, verification templates may be declared such that the one or more credentials may be obtained before further verification actions may be taken. In other cases, for some embodiments, verification templates may obtain customer credentials as they may be needed by various verification actions or verification objects.

At block 906, in one or more of the various embodiments, verification engines may be arranged to determine one or more template objects. In one or more of the various embodiments, agent compilers may be arranged to parse verification template to determine one or more template objects that may be included in the verification template. In some embodiments, agent compilers may be arranged to recognize that various data types may be template objects based on the data types (or classes) of an encounter object.

At block 908, in one or more of the various embodiments, verification engines may be arranged to generate one or more verification objects from the one or more template objects. As described above, in some embodiments, agent compilers may be arranged to employ the customer credentials and sources to collect customer data that may be used to generate verification objects that correspond to the template objects declared in the verification template.

At decision block 910, in one or more of the various embodiments, if there may be more template objects, control may loop back to block 906; otherwise, control may flow to a calling process. As described above, in some embodiments, verification template may declare one or more template objects that each need to be converted into verification objects. Accordingly, in some embodiments, agent compilers may be arranged to parse a verification template until verification objects have been generated for all of the template objects included in the verification template.

Figure 10:
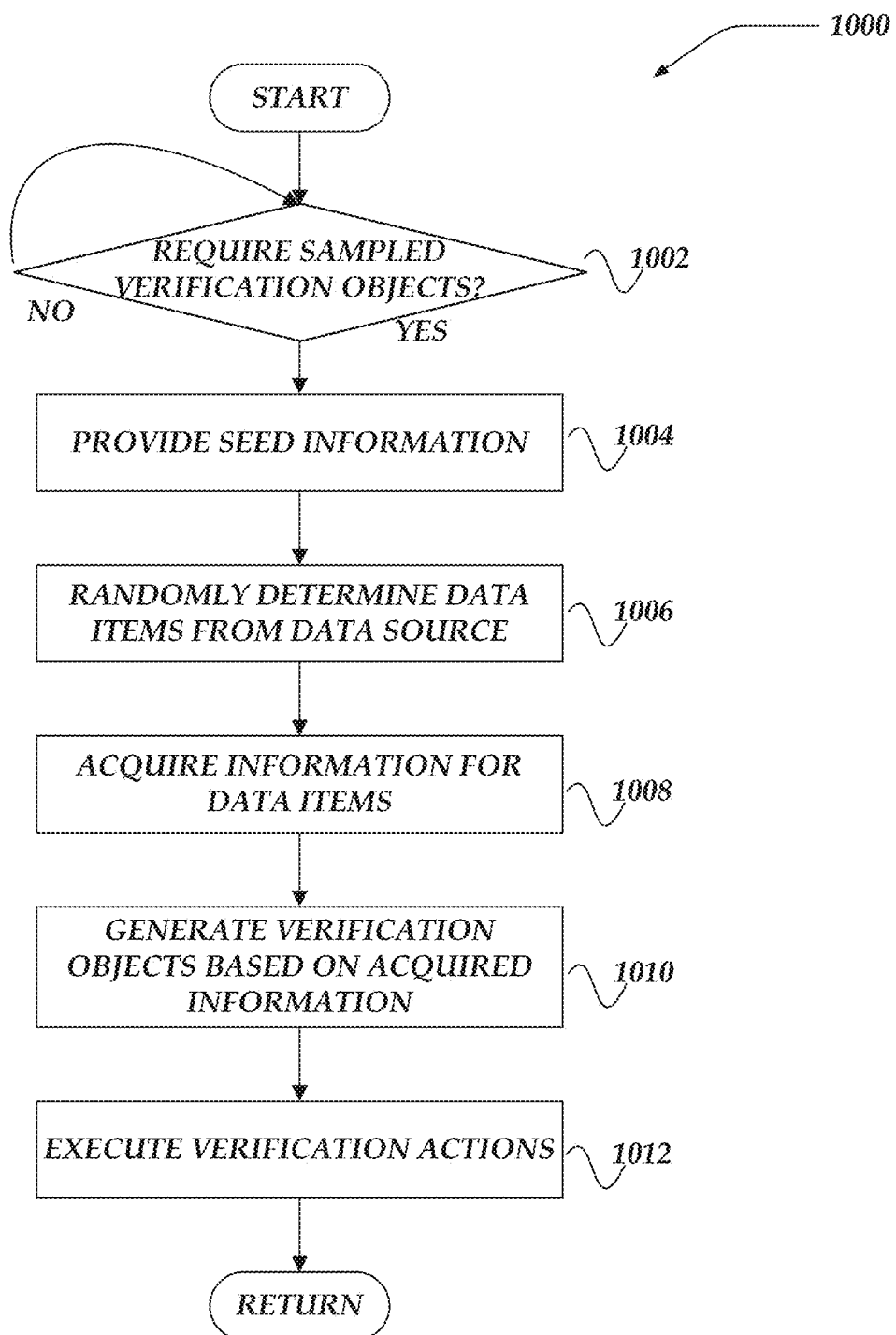
FIG. 10 illustrates a flowchart of a process for verifying performance and operation of live services in accordance with one or more of the various embodiments.

FIG. 10 illustrates a flowchart of process 1000 for verifying performance and operation of live services in accordance with one or more of the various embodiments. After a start block, at decision block 1002, in one or more of the various embodiments, if one or more sampled verification objects may be required, control may flow to block 1004; otherwise, control may loop back to decision block 1002. In some embodiments, verification templates may declare that one or more data items in the customer's service environment may be selected randomly. For example, if a customer's service has 1000 users, the service developer may want to check one or more characteristics of a sample of the users rather than having to check all of the users. Accordingly, in some embodiments, verification templates may be arranged to enable template authors to declare that a random object or collect of random objects may be selected.

At block 1004, in one or more of the various embodiments, seed information may be provided. In some embodiments, seed information may be values that may be provided to initialize a random number generator such that if the same seed information is used the same sequence of numbers will be generated.

In one or more of the various embodiments, seed information may be declared in the verification template. In some embodiments, the seed information may be a value in a format (e.g., an integer or string) that may conform to one or more random number generators that may be available to an agent compiler.

In one or more of the various embodiments, the same seed information may be employed for an entire verification template or set of verification templates. Likewise, in some embodiments, different portions of a verification template or different template objects may be associated with different seed information.

At block 1006, in one or more of the various embodiments, verification engines may be arranged to randomly determine one or more data items from one or more data sources. In one or more of the various embodiments, agent compilers may employ one or more random number generators and the seed information to generate random values that may be employed to determined (or fetch) one or more data items from one or more source user-interfaces or source APIs.

In one or more of the various embodiments, agent compilers may be configured so select from among one or more random number generators based on customer configuration or one or more characteristics of the customer service environment. In some embodiments, agent compilers may be arranged to include an embedded random number generator rather than relying on a random number generator provided by the customer service environment.

In one or more of the various embodiments, agent compilers may be arranged to execute one or more rules, scripts, or the like, to generate one or more identifiers from the random numbers. In some embodiments, verification template or customer configuration information may include one or more templates, masks, or the like, for formatting identifiers from random numbers. For example, in some embodiments, a verification template may declare an identity mask such as, "D-0200????" that may indicate the if a random number of 12029234 is generated it may be used to make an identifier such as D-02009234, and so on. In some embodiments, verification template may include different identifier masks for different template objects or different customers.

In some embodiments, internal libraries or other non-customer specific configuration information may declare identifier masks, filters, filter masks, query templates, or the like, based on one or more conventional or otherwise well-known protocol or patterns. Accordingly, in some embodiments, agent compiler may dynamically select the relevant identifier mask or filter based on one or more characteristics of the customer service environment. For example, if the customer is storing patient information in an EMR platform with a standard/known format for patient identifiers, the agent compiler may determine the rules or mask for generating valid patient identifiers from a random number based on the customer configuration information that identifies the EMR platform being used by the customer.

Also, in some embodiments, source APIs used for acquiring data items from one or more data sources may be annotated such that the agent compiler may determine the format of identifiers from the source API annotations.

Also, in some embodiments, agent compilers may be arranged to fetch a collection of objects via a source API and then select an object or portion of objects from the collection rather than explicitly querying the data source using randomly generated identifiers.

Further, as described above, agent compilers may be arranged to collect data from user-interfaces based on providing simulated user-input and collected the responses (if any) that may be present in the source user-interfaces.

At block 1008, in one or more of the various embodiments, verification engines may be arranged to acquire information for data items from data sources. As described above, agent compilers may employ one or more source APIs to acquire data items that may be used to instantiate verification objects. In one or more of the various embodiments, agent compilers may be arranged to employ one or more source APIs to acquire the data items that correspond to the one or more randomly selected identifiers. Accordingly, in some embodiments, the one or more identifiers may be provided as input parameter values to one or more source APIs to fetch the corresponding data items from one or more data sources.

At block 1010, in one or more of the various embodiments, verification engines may be arranged to generate one or more verification objects based on the acquired information. In some embodiments, agent compilers may be arranged to map some or all of the data items or some or all of the fields from the data items to one or more attributes of a verification object based on the template object(s) declared in the verification template.

At block 1012, In some embodiments, verification engines may be arranged to execute one or more verification actions for the one or more verification objects. As described above, verification template may include one or more verification actions that may be executed on or with the one or more verification objects. For example, in some embodiments, one or more verification actions may be arranged to confirm one or more values of one or more attributes of the one or more verification objects.

Next, in one or more of the various embodiments, control may be returned to a calling process.

Figure 11:
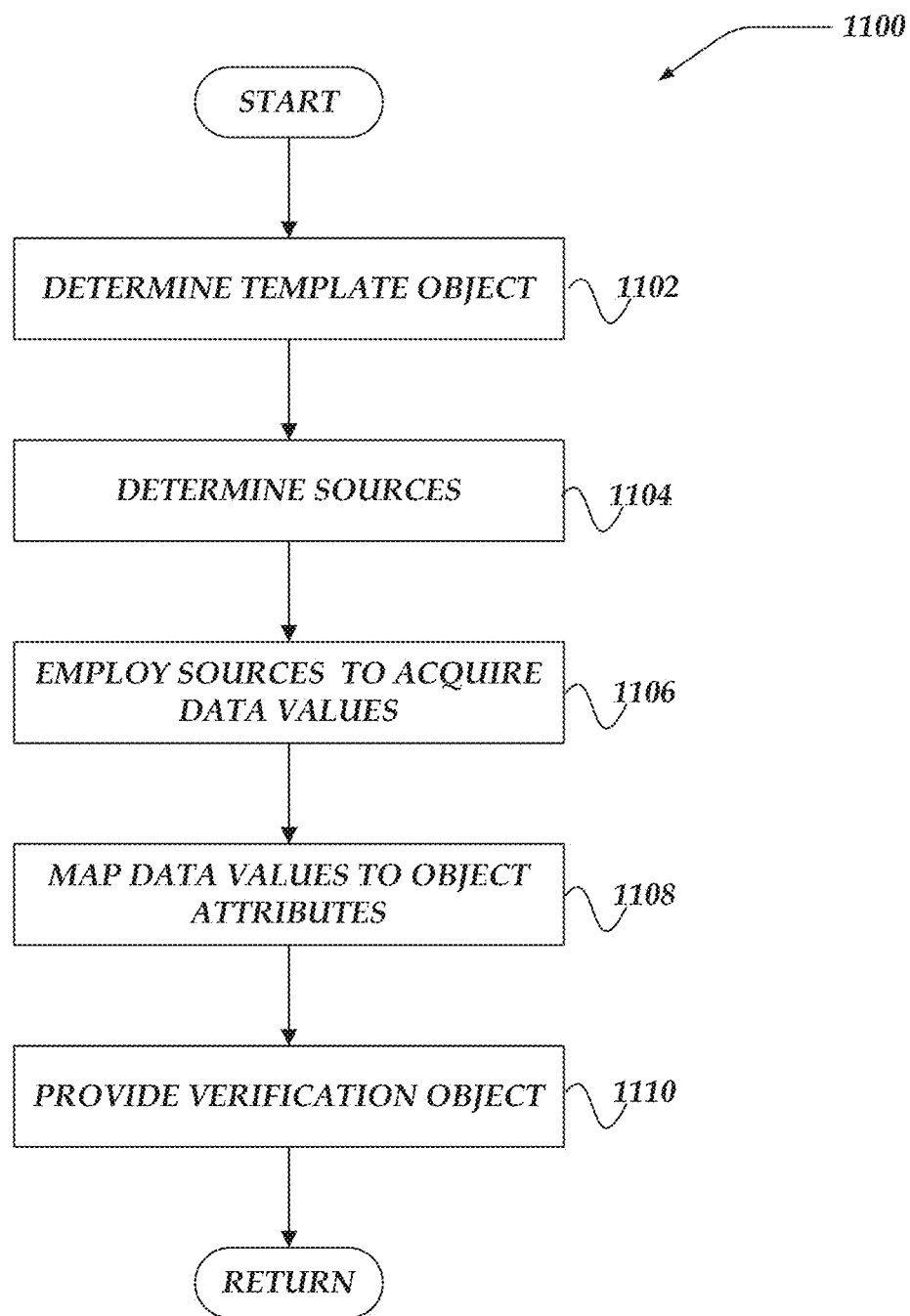
FIG. 11 illustrates a flowchart of a process for verifying performance and operation of live services in accordance with one or more of the various embodiments.

FIG. 11 illustrates a flowchart of process 1100 for verifying performance and operation of live services in accordance with one or more of the various embodiments. After a start block, at block 1102, in one or more of the various embodiments, verification engines may be arranged to determine a template objects and template actions. As described above, verification templates may declare one or more template objects. In some cases, template objects may be declared in a portion of the verification template that may be separate or distinct from the declaration of the template actions. Also, in some embodiments, template object declarations may be inferred based on being included or accessed withing template actions.

At block 1104, in one or more of the various embodiments, verification engines may be arranged to determine a sources. As described above, in some embodiments, agent compilers may be arranged to select from one or more sources depending on the customer service environment or the customer configuration information.

Likewise, in some embodiments, determining a specific source API or source user-interface may depend on the template object. Accordingly, in some embodiments, template object types (e.g., customers, patients, addresses, invoices, or the like) may be associated with specific source APIs or source user-interfaces. In some embodiments, agent compilers may be arranged to associate one or more specific source APIs or source user-interfaces with one or more template object types.

In some embodiments, agent compilers may be arranged to select a particular source API or source user-interface based on a combination of the template object type, customer configuration, or the like. For example, in some embodiments, if the template object is a template patient for a healthcare service, the customer information may declare an external EMR system that may be used by the customer. Accordingly, in this example, for some embodiments, a source API that corresponds to that particular external EMR system may be determined.

In some embodiments, agent compilers may interrogate a customer service environment to determine one or more characteristics or features that may determine which source API or source user-interface may be determined. In some embodiments, agent compilers may be arranged to query an external system to collect information that may be employed to determine which source API or source user-interface to use.

At block 1106, in one or more of the various embodiments, verification engines may be arranged to employ the sources to acquire data values. In one or more of the various embodiments, agent compilers may be arranged to execute one or more calls via the source APIs or source user-interfaces. In some embodiments, agent compilers may be arranged to provide one or more parameters to the source API or source user interface to facilitate the execution of the API calls or simulated user-input.

In one or more of the various embodiments, source APIs may be annotated with additional information that enables agent compilers to provide input parameters that conform to the API. In some embodiments, one or more automated API interface generators may be employed to provide annotated source APIs. Thus, in some embodiments, agent compilers may be arranged to interpret the annotations to determine the input parameters that may be provided to a given call. For example, if the source API call is directed to fetch patient details for a patient object, the source API may require a patient identifier, customer credential information, or the like. Also, in some embodiments, the return values or out parameters of the source API may be annotated the enable the agent compiler to receive the result of the source API.

In some embodiments, agent compilers may be arranged to exchange information via source APIs using structured data exchange formats, such as, XML, JSON, or the like. Thus, in some embodiments, field names, data types, hierarchical relationships, collections (e.g., arrays, lists, hashmaps, dictionaries, or the like) may be expressed in both input parameters or results.

For example, in some embodiments, if a verification template declares that a patient should be selected for use in subsequent verification actions, the agent compiler may employ the appropriate source API or source user-interface to obtain the patient information from one or more internal or external data sources. Note, as mentioned above, in some embodiments, the determination of the particular source API or source user-interface or their execution may be operations performed by the agent compiler rather than being explicitly declared in the verification template itself. Thus, in some embodiments, the same verification template may be used for different customers that may use different types of data sources for storing patient information.

At block 1108, in one or more of the various embodiments, verification engines may be arranged to map the data values to one or more verification object attributes. In one or more of the various embodiments, agent compilers may obtain results from source API calls or source user-interfaces. However, in some embodiments, different data sources, user-interfaces, or source APIs may provide values in a variety of formats. For example, in some embodiments, a source API may return results as labeled string values even though one or more of the returned values may be integer value, floating point values, data-time values, or the like. Accordingly, in some embodiments, agent compilers may be configured to convert one or more data types of the result values to other local data types. Likewise, in some embodiments, results that may be returned in two or more separated fields may be combined into one attribute int the verification object.

Also, in one or more of the various embodiments, results from source API calls or source user-interfaces may include more fields than required. Accordingly, in some embodiments, agent compilers may be arranged to use a portion of the results to generate a verification object.

In one or more of the various embodiments, source APIs may include annotations that describe mappings from fields in call results to verification object attributes. In some embodiments, mapping rules may provide a normalized interface that enables more than source API to provide values for the attributes of verification objects. For example, in some embodiments, a mapping rule such as "'Name' or 'Patient Name' or PatientName'=>'name'" may define how fields labeled as 'Name' or 'Patient Name' or PatientName' may be mapped to an attribute labeled as 'name' in a verification object. Note, one of ordinary skill in the art will appreciate that a variety of data structures, annotations, computer languages, or the like, may be used to declare how field values from results from source API calls or source user-interfaces may be mapped to attributes of verification objects.

At block 1110, in one or more of the various embodiments, verification engines may be arranged to provide the verification object. As described above, verification template may declare one or more template objects and one or more verification actions. Accordingly, in some embodiments, the instantiated verification object may be provided to enable one or more verification actions associated with the verification object to be executed.

Next, in one or more of the various embodiments, control may be returned to a calling process.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor to provide steps for implementing the actions specified in the flowchart block or blocks. The computer program instructions may also cause at least some of the operational steps shown in the blocks of the flowchart to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems, which perform the specified actions or steps, or combinations of special purpose hardware and computer instructions. The foregoing example should not be construed as limiting or exhaustive, but rather, an illustrative use case to show an implementation of at least one of the various embodiments of the invention.

Further, in one or more embodiments (not shown in the figures), the logic in the illustrative flowcharts may be executed using an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. In one or more embodiments, a microcontroller may be arranged to directly execute its own embedded logic to perform actions and access its own internal memory and its own external Input and Output Interfaces (e.g., hardware pins or wireless transceivers) to perform actions, such as System On a Chip (SOC), or the like.

What is claimed as new and desired to be protected by Letters Patent of the United States is:

1. A method for managing applications over a network using one or more processors that are configured to execute instructions, wherein the execution of the instructions enables performance of actions, comprising:
    providing one or more applications that are operative in a computing environment for a user and directed to a plurality of organizations, wherein a portion of the one or more applications include data associated with an organization from the plurality of organizations and a remainder of other applications include data associated with one or more other organizations from the plurality of organizations;
    providing one or more templates that declare one or more template objects, wherein the one or more template objects are directed to verifying one or more features of the one or more applications;
    providing data associated with the organization based on the one or more template objects, wherein the data is obtained from the portion of the one or more the applications or a data store associated with the portion of the one or more applications;
    generating one or more verification objects based on at least a user credential, a source, the one or more template objects and the provided data associated with the organization;
    employing the one or more verification objects to verify the one or more features of the one or more applications based on one or more conditions and the provided data associated with the organization; and
    generating one or more reports that include one or more results based on one or more conditions and the provided data associated with the organization and the one or more verified features of the one or more applications.

2. The method of claim 1, wherein providing the data associated with the organization, further comprises:
    generating one or more random values based on a seed value associated with the organization, wherein reuse of a same seed value for the same organization generates the same one or more random values; and
    determining the provided data associated with the organization based on the one or more random values and one or more source application programming interfaces.

3. The method of claim 1, wherein employing the one or more verification objects, further comprises:

executing one or more verification actions based on the verification objects and the provided data associated with the organization;

in response to one or more affirmative results for the one or more verification actions, determining that the one or more features of the one or more applications associated with the one or more verification actions are verified; and in response to one or more negative results for the one or more verification actions, determining that the one or more features of the one or more applications associated with the one or more verification actions are unverified.

4. The method of claim 1, wherein generating the one or more verification objects, further comprises:

determining one or more source application programming interfaces (APIs) or source user-interfaces based on a verification template;

providing one or more declared parameter values based on one or more parameter declarations in the verification template;

providing one or more other parameter values for a randomized selection of values from the provided data associated with the organization, wherein the randomized selection of values is based on a seed value associated with the organization;

executing the one or more source APIs or the one or more source user-interfaces with the one or more declared parameter values and the one or more other parameter values to provide one or more data values associated with the organization, wherein the one or more data values associated with the organization are included in the one or more verification objects; and in response to one or more subsequent executions of the one or more source APIs or the one or more source user-interfaces for the same organization, employing the seed value to provide the one or more other parameter values.

5. The method of claim 1, further comprising:

in response to the one or more applications separately supporting two or more separate organizations, performing further actions, including:

generating the one or more verification objects for each separate organization;

generating two or more verification agents based on the one or more verification objects, wherein each verification agent is based on the one or more verification objects that correspond to each separate organization; and executing each verification agent in a computing environment associated with the two or more separate organizations to verify the one or more features of the one or more applications for the two or more separate organizations.

6. A network computer for managing applications over a network, comprising:

a memory that stores at least instructions; and one or more processors that execute instructions that perform actions, including:

providing one or more applications that are operative in a computing environment for a user and directed to a plurality of organizations, wherein a portion of the one or more applications include data associated with an organization from the plurality of organizations and a remainder of other applications include data associated with one or more other organizations from the plurality of organizations;

providing one or more templates that declare one or more template objects, wherein the one or more template objects are directed to verifying one or more features of the one or more applications;

providing data associated with the organization based on the one or more template objects, wherein the data is obtained from the portion of the one or more the applications or a data store associated with the portion of the one or more applications;

generating one or more verification objects based on at least a user credential, a source, the one or more template objects and the provided data associated with the organization;

employing the one or more verification objects to verify the one or more features of the one or more applications based on one or more conditions and the provided data associated with the organization; and generating one or more reports that include one or more results based on one or more conditions and the provided data associated with the organization and the one or more verified features of the one or more applications.

7. The network computer of claim 6, wherein providing the data associated with the organization, further comprises:

generating one or more random values based on a seed value associated with the organization, wherein reuse of a same seed value for the same organization generates the same one or more random values; and determining the provided data associated with the organization based on the one or more random values and one or more source application programming interfaces.

8. The network computer of claim 6, wherein employing the one or more verification objects, further comprises:

executing one or more verification actions based on the verification objects and the provided data associated with the organization;

in response to one or more affirmative results for the one or more verification actions, determining that the one or more features of the one or more applications associated with the one or more verification actions are verified; and in response to one or more negative results for the one or more verification actions, determining that the one or more features of the one or more applications associated with the one or more verification actions are unverified.

9. The network computer of claim 6, wherein generating the one or more verification objects, further comprises:

determining one or more source application programming interfaces (APIs) or source user-interfaces based on a verification template;

providing one or more declared parameter values based on one or more parameter declarations in the verification template;

providing one or more other parameter values for a randomized selection of values from the provided data associated with the organization, wherein the randomized selection of values is based on a seed value associated with the organization;

executing the one or more source APIs or the one or more source user-interfaces with the one or more declared parameter values and the one or more other parameter values to provide one or more data values associated with the organization, wherein the one or more data values associated with the organization are included in the one or more verification objects; and in response to one or more subsequent executions of the one or more source APIs or the one or more source user-interfaces for the same organization, employing the seed value to provide the one or more other parameter values.

10. The network computer of claim 6, wherein the one or more processors execute instructions that perform actions, further comprising:
in response to the one or more applications separately supporting two or more separate organizations, performing further actions, including;
generating the one or more verification objects for each separate organization;
generating two or more verification agents based on the one or more verification objects, wherein each verification agent is based on the one or more verification objects that correspond to each separate organization; and
executing each verification agent in a computing environment associated with the two or more separate organizations to verify the one or more features of the one or more applications for the two or more separate organizations.

11. A system for managing applications over a network: a network computer, comprising:
a memory that stores at least instructions; and
one or more processors that execute instructions that perform actions, including:
providing one or more applications that are operative in a computing environment for a user and directed to a plurality of organizations, wherein a portion of the one or more applications include data associated with an organization from the plurality of organizations and a remainder of other applications include data associated with one or more other organizations from the plurality of organizations;
providing one or more templates that declare one or more template objects, wherein the one or more template objects are directed to verifying one or more features of the one or more applications;
providing data associated with the organization based on the one or more template objects, wherein the data is obtained from the portion of the one or more the applications or a data store associated with the portion of the one or more applications;
generating one or more verification objects based on at least a user credential, a source, the one or more template objects and the provided data associated with the organization;
employing the one or more verification objects to verify the one or more features of the one or more applications based on one or more conditions and the provided data associated with the organization; and
generating one or more reports that include one or more results based on one or more conditions and the provided data associated with the organization and the one or more verified features of the one or more applications; and
a client computer, comprising:
a memory that stores at least instructions; and
one or more processors that execute instructions that perform actions, including:
displaying the one or more reports.

12. The system of claim 11, wherein providing the data associated with the organization, further comprises:
generating one or more random values based on a seed value associated with the organization, wherein reuse of a same seed value for the same organization generates the same one or more random values; and
determining the provided data associated with the organization based on the one or more random values and one or more source application programming interfaces.

13. The system of claim 11, wherein employing the one or more verification objects, further comprises:
executing one or more verification actions based on the verification objects and the provided data associated with the organization;
in response to one or more affirmative results for the one or more verification actions, determining that the one or more features of the one or more applications associated with the one or more verification actions are verified; and
in response to one or more negative results for the one or more verification actions, determining that the one or more features of the one or more applications associated with the one or more verification actions are unverified.

14. The system of claim 11, wherein generating the one or more verification objects, further comprises:
determining one or more source application programming interfaces (APIs) or source user-interfaces based on a verification template;
providing one or more declared parameter values based on one or more parameter declarations in the verification template;
providing one or more other parameter values for a randomized selection of values from the provided data associated with the organization, wherein the randomized selection of values is based on a seed value associated with the organization;
executing the one or more source APIs or the one or more source user-interfaces with the one or more declared parameter values and the one or more other parameter values to provide one or more data values associated with the organization, wherein the one or more data values associated with the organization are included in the one or more verification objects; and
in response to one or more subsequent executions of the one or more source APIs or the one or more source user-interfaces for the same organization, employing the seed value to provide the one or more other parameter values.

15. The system of claim 11, wherein the one or more network computer processors execute instructions that perform actions, further comprising:
in response to the one or more applications separately supporting two or more separate organizations, performing further actions, including;
generating the one or more verification objects for each separate organization;
generating two or more verification agents based on the one or more verification objects, wherein each verification agent is based on the one or more verification objects that correspond to each separate organization; and
executing each verification agent in a computing environment associated with the two or more separate organizations to verify the one or more features of the one or more applications for the two or more separate organizations.

16. A processor readable non-transitory storage media that includes instructions for managing applications, wherein execution of the instructions by one or more processors, performs actions, comprising:

providing one or more applications that are operative in a computing environment for a user and directed to a plurality of organizations, wherein a portion of the one or more applications include data associated with an organization from the plurality of organizations and a remainder of other applications include data associated with one or more other organizations from the plurality of organizations;

providing one or more templates that declare one or more template objects, wherein the one or more template objects are directed to verifying one or more features of the one or more applications;

providing data associated with the organization based on the one or more template objects, wherein the data is obtained from the portion of the one or more applications or a data store associated with the portion of the one or more applications;

generating one or more verification objects based on at least a user credential, a source, the one or more template objects and the provided data associated with the organization;

employing the one or more verification objects to verify the one or more features of the one or more applications based on one or more conditions and the provided data associated with the organization; and generating one or more reports that include one or more results based on one or more conditions and the provided data associated with the organization and the one or more verified features of the one or more applications.

17. The media of claim 16, wherein providing the data associated with the organization, further comprises:

generating one or more random values based on a seed value associated with the organization, wherein reuse of a same seed value for the same organization generates the same one or more random values; and determining the provided data associated with the organization based on the one or more random values and one or more source application programming interfaces.

18. The media of claim 16, wherein employing the one or more verification objects, further comprises:

executing one or more verification actions based on the verification objects and the provided data associated with the organization;

in response to one or more affirmative results for the one or more verification actions, determining that the one or more features of the one or more applications associated with the one or more verification actions are verified; and in response to one or more negative results for the one or more verification actions, determining that the one or more features of the one or more applications associated with the one or more verification actions are unverified.

19. The media of claim 16, wherein generating the one or more verification objects, further comprises:

determining one or more source application programming interfaces (APIs) or one or more source user-interfaces based on a verification template;

providing one or more declared parameter values based on one or more parameter declarations in the verification template;

providing one or more other parameter values for a randomized selection of values from the provided data associated with the organization, wherein the randomized selection of values is based on a seed value associated with the organization;

executing the one or more source APIs or the one or more source user-interfaces with the one or more declared parameter values and the one or more other parameter values to provide one or more data values associated with the organization, wherein the one or more data values associated with the organization are included in the one or more verification objects; and in response to one or more subsequent executions of the one or more source APIs or the one or more source user-interfaces for the same organization, employing the seed value to provide the one or more other parameter values.

20. The media of claim 16, further comprising:

in response to the one or more applications separately supporting two or more separate organizations, performing further actions, including;

generating the one or more verification objects for each separate organization;

generating two or more verification agents based on the one or more verification objects, wherein each verification agent is based on the one or more verification objects that correspond to each separate organization; and executing each verification agent in a computing environment associated with the two or more separate organizations to verify the one or more features of the one or more applications for the two or more separate organizations.

* * * * *